United States Patent
Kondo et al.

(10) Patent No.: US 10,848,727 B2
(45) Date of Patent: Nov. 24, 2020

(54) IMAGE PROCESSING DEVICE, INFORMATION GENERATION DEVICE, AND INFORMATION GENERATION METHOD

(71) Applicant: SONY CORPORATION, Tokyo (JP)

(72) Inventors: Yuhi Kondo, Tokyo (JP); Shun Kaizu, Kanagawa (JP); Teppei Kurita, Tokyo (JP); Tuo Zhuang, Kanagawa (JP); Yasutaka Hirasawa, Tokyo (JP); Ying Lu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/313,394

(22) PCT Filed: Jun. 13, 2017

(86) PCT No.: PCT/JP2017/021793
§ 371 (c)(1),
(2) Date: Dec. 26, 2018

(87) PCT Pub. No.: WO2018/037678
PCT Pub. Date: Mar. 1, 2018

(65) Prior Publication Data
US 2019/0166342 A1    May 30, 2019

(30) Foreign Application Priority Data
Aug. 24, 2016  (JP) .................................. 2016-163627

(51) Int. Cl.
*H04N 9/64*     (2006.01)
*H04N 5/232*    (2006.01)
(Continued)

(52) U.S. Cl.
CPC ................ *H04N 9/646* (2013.01); *G01J 3/50* (2013.01); *G01J 4/04* (2013.01); *H04N 5/232* (2013.01); *H04N 9/735* (2013.01); *H04N 17/002* (2013.01)

(58) Field of Classification Search
None
See application file for complete search history.

(56) References Cited

U.S. PATENT DOCUMENTS

2012/0249752 A1    10/2012  Baba
2014/0267451 A1*   9/2014   Kumamoto .............. G09G 5/10
                                                                345/690
(Continued)

FOREIGN PATENT DOCUMENTS

CN    102707449 A    10/2012
CN    104635407 A     5/2015
(Continued)

OTHER PUBLICATIONS

Wolff et al., Constraining Object Features Using a Polarization Reflectance Model, IEEE Transactions on Pattern Analysis and Machine Intelligence, Jul. 1991, pp. 635-657, vol. 13, No. 7.
(Continued)

*Primary Examiner* — Samira Monshi
(74) *Attorney, Agent, or Firm* — Paratus Law Group, PLLC

(57) ABSTRACT

A correction information generation section 50 emits measurement light having uniform intensity onto a polarized image acquisition section 20 acquiring a polarized image. Further, on the basis of a measured polarized image acquired from the polarized image acquisition section 20, the correction information generation section 50 generates variation correction information for correcting sensitivity variations caused in the measured polarized image due to difference in polarization direction, and causes a correction information
(Continued)

storage section 30 to store the generated variation correction information. A correction processing section 40 then corrects the sensitivity variations caused in the polarized image acquired by the polarized image acquisition section 20 due to the difference in polarization direction by using the pre-generated variation correction information stored in the correction information storage section 30. Therefore, the polarized image outputted from the correction processing section 40 becomes a high-quality polarized image with, for example, its sensitivity variations corrected.

9 Claims, 23 Drawing Sheets

(51) Int. Cl.
*G01J 3/50* (2006.01)
*G01J 4/04* (2006.01)
*H04N 9/73* (2006.01)
*H04N 17/00* (2006.01)

(56) References Cited

U.S. PATENT DOCUMENTS

| | | |
|---|---|---|
| 2015/0172609 A1 | 6/2015 | Otani |
| 2015/0301351 A1* | 10/2015 | Kobayashi ........... H04N 13/218 348/49 |

FOREIGN PATENT DOCUMENTS

| | | |
|---|---|---|
| JP | 2006-013731 A | 1/2006 |
| JP | 2007-134903 A | 5/2007 |
| JP | 2009-192520 A | 8/2009 |
| WO | WO 2008/099589 A1 | 8/2008 |
| WO | WO 2014/119257 A1 | 8/2014 |

OTHER PUBLICATIONS

Atkinson et al., Recovery of Surface Orientation From Diffuse Polarization, IEEE Transactions on Image Processing, Jun. 2006, pp. 1653-1664, vol. 15, No. 6.

May 22, 2020, Chinese Office Action issued for related CN application No. 201780048453.3.

* cited by examiner

FIG.3
(a) 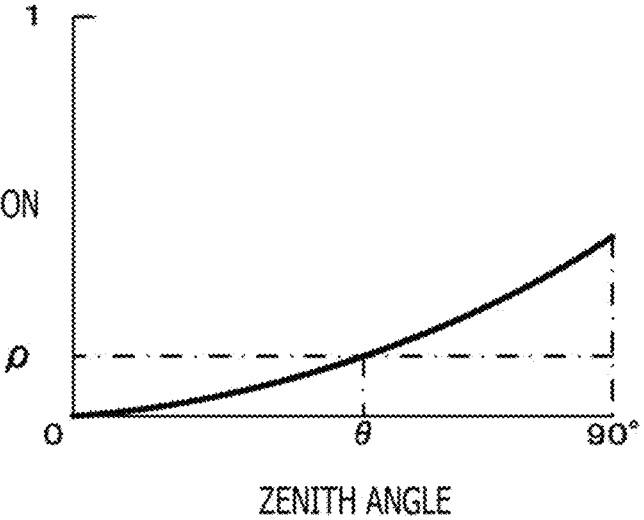
(b) 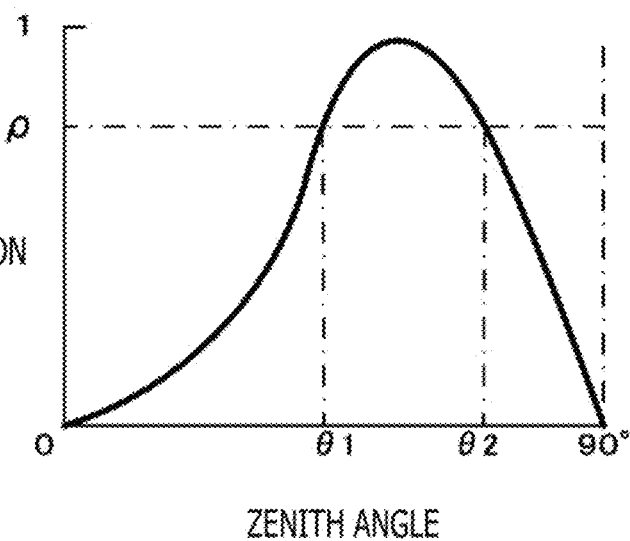

FIG. 6
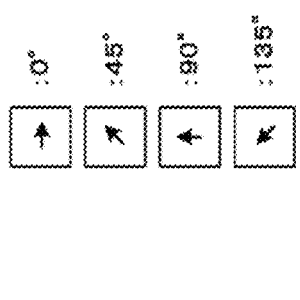
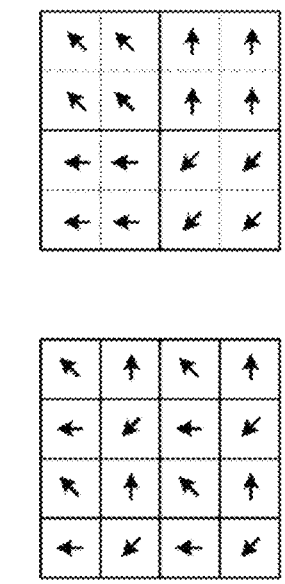
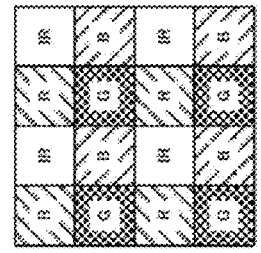
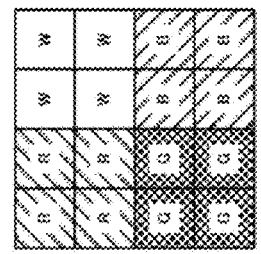
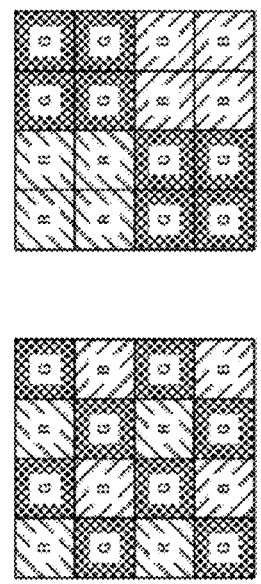

FIG. 20

IMAGE PROCESSING DEVICE, INFORMATION GENERATION DEVICE, AND INFORMATION GENERATION METHOD

CROSS REFERENCE TO PRIOR APPLICATION

This application is a National Stage Patent Application of PCT International Patent Application No. PCT/JP2017/021793 (filed on Jun. 13, 2017) under 35 U.S.C. § 371, which claims priority to Japanese Patent Application No. 2016-163627 (filed on Aug. 24, 2016), which are all hereby incorporated by reference in their entirety.

TECHNICAL FIELD

The present technology relates to an image processing device, an information generation device, and an information generation method, and makes it possible to acquire high-quality polarized images.

BACKGROUND ART

A method of generating polarized images by using an imaging section and a polarizer has been disclosed in the past. A method disclosed, for example, in PTL 1 generates polarized images having a plurality of polarization directions by disposing the polarizer in front of the imaging section and rotating the polarizer for image capturing. Another disclosed method generates polarized images having a plurality of polarization directions by performing one image capturing operation in a situation where polarizers having different polarization directions are disposed for individual pixels.

Further, normal line information regarding an object is generated from polarized images having a plurality of polarization directions. Methods disclosed, for example, in NPL 1 and NPL 2 generate normal line information by applying polarized images having a plurality of polarization directions to a polarization model equation.

CITATION LIST

Patent Literature

[PTL 1]
WO 2008/099589
[NPL 1]
Lawrence B. Wolff and Terrance E. Boult, "Constraining Object Features Using a Polarization Reflectance Model," IEEE Transaction on pattern analysis and machine intelligence, Vol. 13, No. 7, July 1991
[NPL 2]
Gary A. Atkinson and Edwin R. Hancock, "Recovery of surface orientation from diffuse polarization," IEEE Transactions of Image Processing, Vol. 15, Issue 6, pp. 1653-1664, 2006

SUMMARY

Technical Problem

Meanwhile, when polarized images are generated with an image sensor having a polarizer for each pixel, sensitivity variations occur due, for instance, to the difficulty in forming a polarizer on a minute pixel. Therefore, even if images of an unpolarized object having uniform luminance are captured, the luminance of the resulting polarized images varies.

In view of the above circumstances, the present technology has an object to provide an image processing device, an information generation device, and an information generation method that acquire high-quality polarized images.

Solution to Problem

According to a first aspect of the present technology, there is provided an image processing device including a correction processing section. The correction processing section uses pre-generated correction information to correct sensitivity variations due to difference in polarization direction.

The present technology causes a measurement light irradiation section to emit measurement light having uniform intensity onto a polarized image acquisition section having a polarization imaging element with a polarizer disposed. The polarized image acquisition section then acquires polarized images including pixels having a plurality of polarization directions. On the basis of the acquired polarized images, a correction gain is pre-stored in a correction information storage section as correction information for correcting sensitivity variations caused in the polarized images due to the difference in polarization direction. The correction information is generated, for example, for each polarization direction or for each pixel in the polarized images. Further, the correction information includes information for correcting shading in the polarized images. Furthermore, when the polarized images are color images, the correction information is generated for each color component of the polarized images and includes information for correcting a white balance of the polarized images. The correction processing section uses the pre-generated correction information stored in the correction information storage section to correct the sensitivity variations caused in the polarized images due to the difference in polarization direction.

According to a second aspect of the present technology, there is provided an information generation device including a measurement light irradiation section and a correction information generation section. The measurement light irradiation section emits measurement light having uniform intensity onto a polarized image acquisition section acquiring polarized images. The correction information generation section, on the basis of the polarized images acquired by the polarized image acquisition section when the measurement light is emitted from the measurement light irradiation section, generates correction information for correcting sensitivity variations caused in the polarized images due to the difference in polarization direction.

The present technology causes the measurement light irradiation section to emit the measurement light having uniform intensity onto the polarized image acquisition section acquiring the polarized images. The measurement light irradiation section emits, for example, unpolarized light onto the polarized image acquisition section. Alternatively, the measurement light irradiation section emits measurement light onto the polarized image acquisition section through a spherical diffusion plate. The correction information generation section allows the measurement light irradiation section to emit the measurement light onto the polarized image acquisition section, which uses a predetermined imaging optical system, and generates the correction information for correcting the sensitivity variations caused in the polarized images due to the difference in polarization direction on the basis of the polarized images acquired by the polarized image acquisition section.

Further, the measurement light irradiation section emits the measurement light onto the polarized image acquisition section through a flat diffusion plate, and the correction information generation section changes the orientation of the polarized image acquisition section with respect to the flat diffusion plate. Alternatively, the measurement light irradiation section emits the measurement light onto the polarized image acquisition section through the flat diffusion plate, and the correction information generation section generates the correction information for each pixel on the basis of a focal length and an optical axis center of the polarized image acquisition section.

According to a third aspect of the present technology, there is provided an information generation method including: emitting measurement light having uniform intensity from a measurement light irradiation section onto a polarized image acquisition section acquiring polarized images; and generating, by a correction information generation processing section, correction information for correcting sensitivity variations caused in the polarized images due to the difference in polarization direction, on the basis of the polarized images acquired by the polarized image acquisition section when the measurement light is emitted from the measurement light irradiation section.

Advantageous Effects of Invention

According to the present technology, a correction process is performed on polarized images by using pre-generated correction information to correct sensitivity variations caused due to difference in polarization direction. This makes it possible to acquire high-quality polarized images. Note that advantages described in this specification are merely illustrative and not restrictive. Further, the present technology can provide additional advantages.

BRIEF DESCRIPTION OF DRAWINGS

FIG. 3 is a diagram illustrating a relationship between polarization degree and zenith angle.

FIG. 6 is a diagram illustrating a polarizer and a color filter.

FIG. 20 is a diagram illustrating a fourth embodiment of the correction information generation section.

DESCRIPTION OF EMBODIMENTS

Embodiments of the present technology will now be described. It should be noted that the description is given in the following order.

1. Acquisition of Polarized Images
2. Configuration of Polarized Image System
3. Operation of Correction Processing Section
4. Generation of Variation Correction Information
4-1. First Embodiment of Correction Information Generation Section
4-2. Second Embodiment of Correction Information Generation Section
4-3. Third Embodiment of Correction Information Generation Section
4-4. Fourth Embodiment of Correction Information Generation Section
5. Alternative Configurations and Operations
6. Exemplary Applications <1. Acquisition of Polarized Images>

Figure 1:
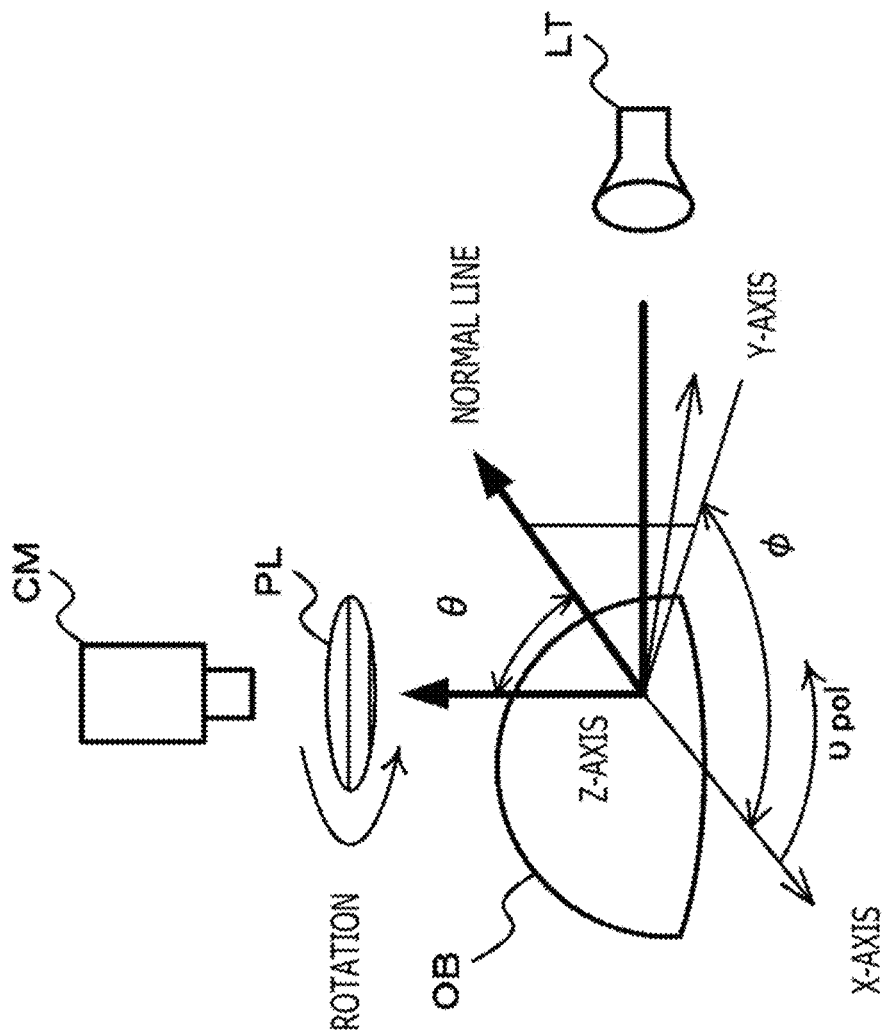
FIG. 1 is a diagram illustrating acquisition of polarized images.
Figure 2:
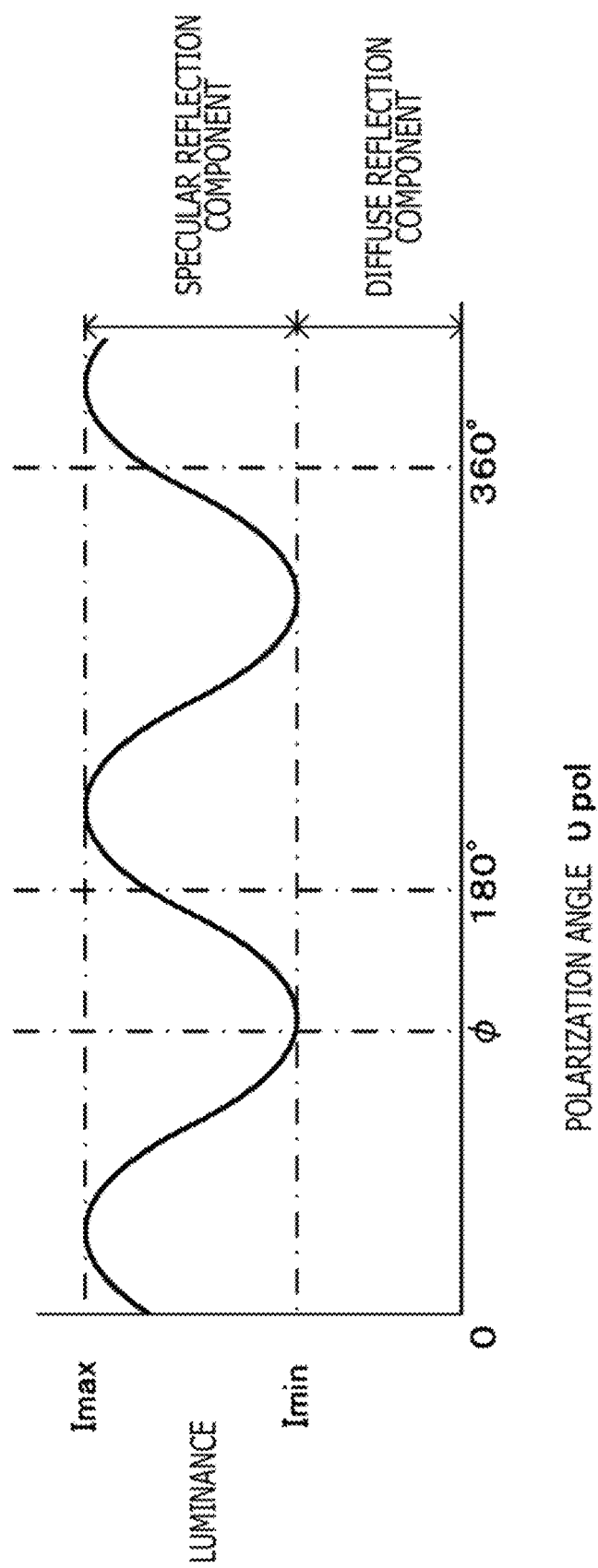
FIG. 2 is a diagram illustrating a relationship between luminance and polarization angle.

FIG. 1 illustrates acquisition of polarized images. As illustrated, for example, in FIG. 1, a light source LT illuminates an object OB, and an imaging section CM captures images of the object OB through a polarizer PL. In this case, the captured images are such that the luminance of the object OB changes in accordance with the polarization direction of the polarizer PL. For ease of explanation, it is assumed that when, for example, the polarization direction is rotated, the highest luminance is Imax while the lowest luminance is Imin. Further, it is assumed that when the x- and y-axes of two-dimensional coordinates are in the plane of the polarizer and the polarization direction of the polarizer is rotated, the angle of y-axis direction with respect to the x-axis is the polarization angle vpol. The polarization direction of the polarizer reverts to a previous polarization state when it is rotated through 180 degrees while the z-axis direction is regarded as an axis, that is, has a cycle of 180 degrees. Moreover, the luminance 1 observed when the polarization direction is rotated can be expressed by Equation (1). It should be noted that FIG. 2 illustrates a relationship between luminance and polarization angle.

[Math. 1]

$$I_{pol} = \frac{I_{max} + I_{min}}{2} + \frac{I_{max} - I_{min}}{2}\cos 2(\upsilon_{pol} - \phi) \quad (1)$$

In Equation (1), the polarization angle vpol is obvious at the time of polarized-image generation, and the maximum luminance Imax, the minimum luminance Imin, and an azimuth angle φ are variables. Therefore, when the luminance of polarized images having three or more different polarization directions is used to perform fitting with respect to a polarization model equation indicated in Equation (1), the luminance of a desired azimuth angle φ can be estimated on the basis of the polarization model equation indicative of the relationship between luminance and polarization angle.

Further, the normal line of an object surface can be indicated by the azimuth angle φ and the zenith angle θ through the use of a polar coordinate system. It is assumed that the zenith angle θ is an angle measured from the z-axis toward the normal line while the azimuth angle φ is an angle in the y-axis direction with respect to the x-axis as mentioned earlier. Here, on the basis of Equation (2), a polarization degree ρ can be calculated from the minimum luminance Imin and the maximum luminance Imax.

[Math. 2]

$$\rho = \frac{I_{max} - I_{min}}{I_{max} + I_{min}} \quad (2)$$

It is known that the relationship between polarization degree and zenith angle has, for example, characteristics depicted in (a) of FIG. 3 in the case of diffuse reflection and characteristics depicted in (b) of FIG. 3 in the case of specular reflection. If, for example, the zenith angle θ is 0, the polarization degree ρ is 0. More specifically, the minimum luminance Imin is equal to the maximum luminance Imax so that the luminance is fixed irrespective of the azimuth angle φ.

<2. Configuration of Polarized Image System>

Figure 4:
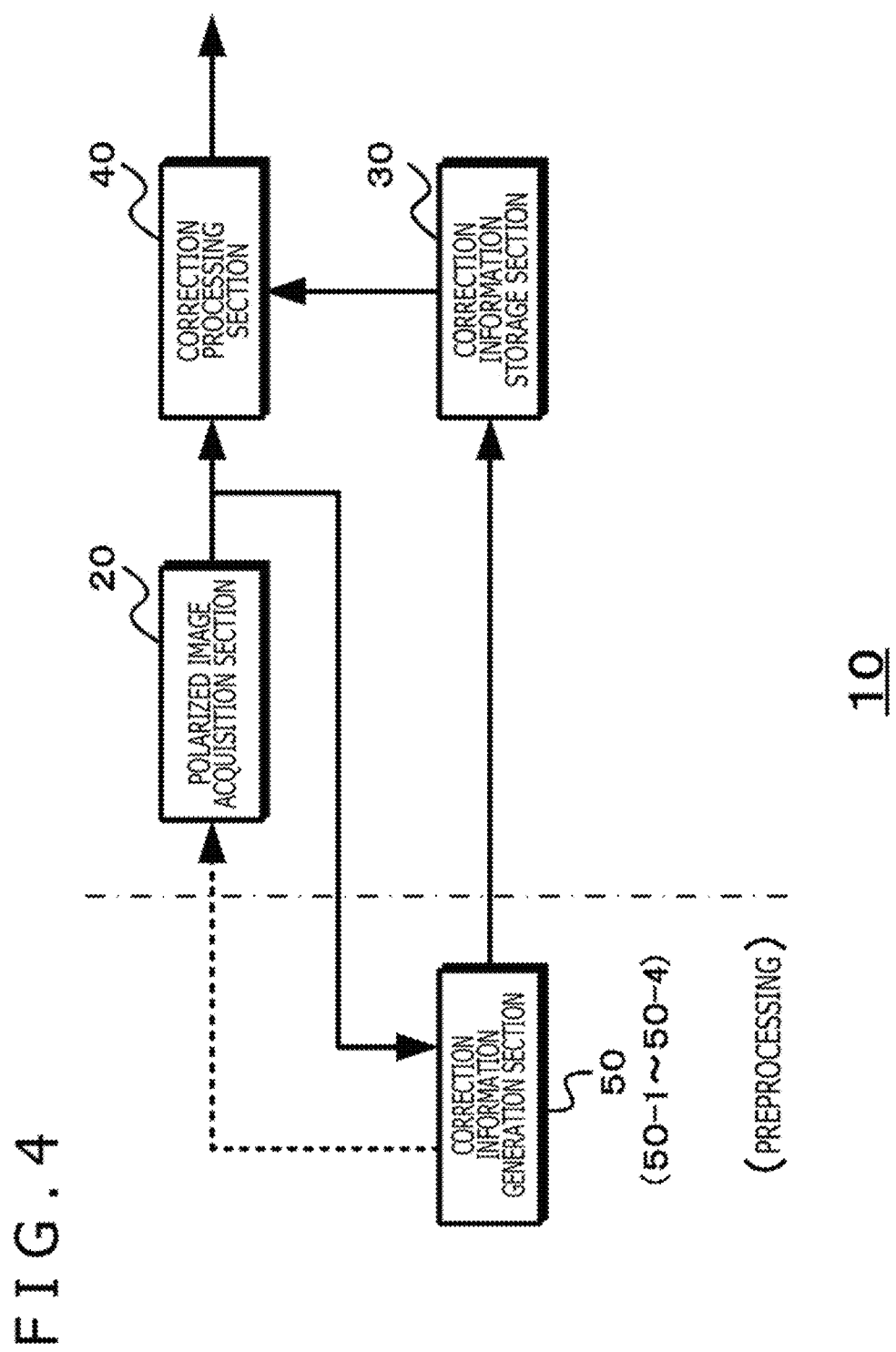
FIG. 4 is a diagram illustrating a configuration of a polarized image system in which an image processing device is used.

FIG. 4 illustrates a configuration of a polarized image system that uses an image processing device according to the present technology. The polarized image system 10 includes a polarized image acquisition section 20, a correction information storage section 30, and a correction processing section 40. Further, the polarized image system 10 may use a correction information generation section 50 that generates variation correction information and stores it in the correction information storage section 30.

Figure 5:
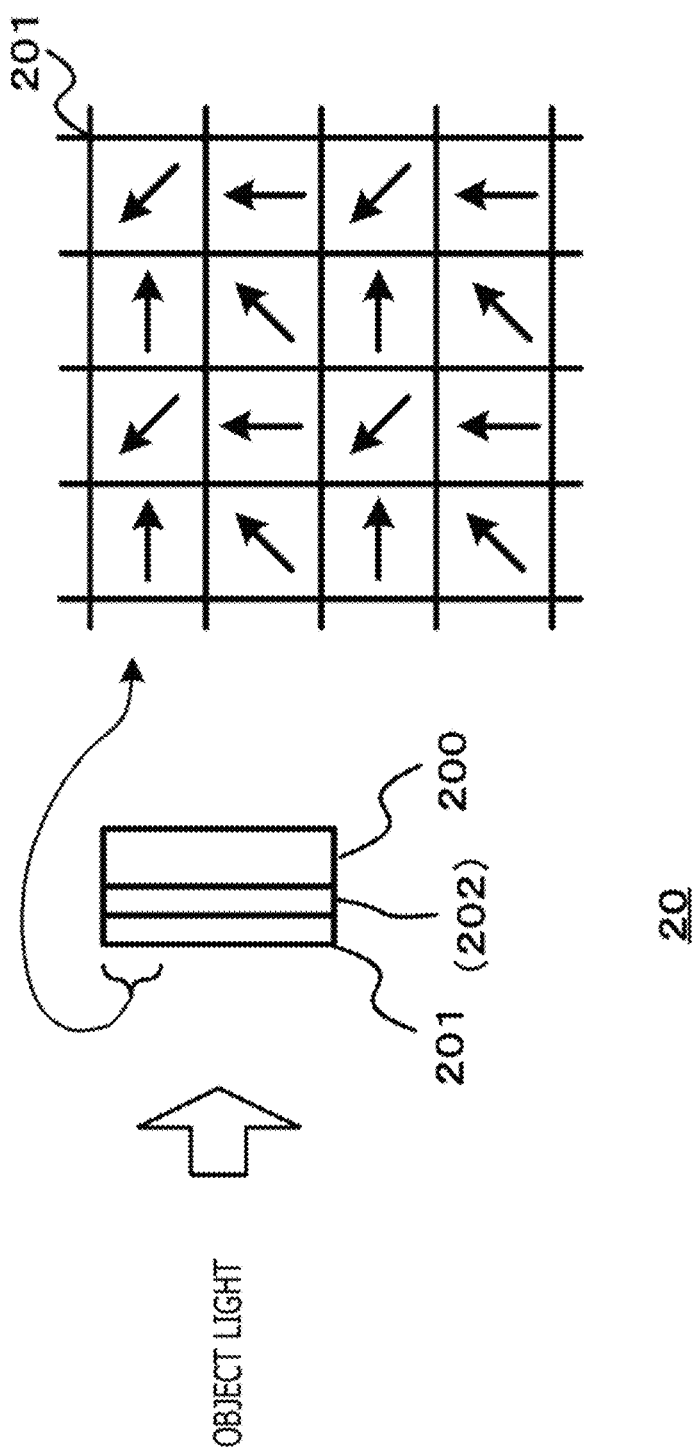
FIG. 5 is a diagram illustrating a configuration of a polarized image acquisition section.

The polarized image acquisition section 20 acquires polarized images including pixels having a plurality of polarization directions. FIG. 5 illustrates a configuration of the polarized image acquisition section. The polarized image acquisition section 20 includes an image sensor 200, such as a CMOS (complementary metal oxide semiconductor) image sensor or a CCD (charge-coupled device) image sensor, and a polarizer 201, or includes the image sensor 200, the polarizer 201, and a color filter 202. The image sensor 200 performs photoelectric conversion of object light that is incident through the polarizer 201 or through the polarizer 201 and the color filter 202, and generates an image signal in response to the object light, that is, an image signal representative of the polarized images. The polarized image acquisition section 20 outputs the image signal representative of the polarized images to the correction processing section 40. Further, in a case where the correction information generation section 50 is used, the polarized image acquisition section 20 outputs the image signal representative of the polarized images to the correction information generation section 50.

FIG. 6 illustrates the polarizer and the color filter. (a) and (b) of FIG. 6 illustrate polarization patterns of the polarizer 201. It is demanded that the polarizer 201 merely extract linearly polarized light. Thus, for example, a wire grid or a photonic liquid crystal is used as the polarizer 201. (a) of FIG. 6 illustrates a case where pixels having a plurality of polarization directions (e.g., four directions, namely, 0, 45, 90, and 135 degrees) are disposed so as to perform fitting with respect to the polarization model equation indicated, for example, in Equation (1) on the assumption that one pixel corresponds to a polarized component unit. Meanwhile, (b) of FIG. 6 illustrates a case where the color component arrangement unit of the color filter corresponds, for example, to a unit of 2×2 pixels, and pixels having a plurality of polarization directions (e.g., four directions, namely, 0, 45, 90, and 135 degrees) are disposed as mentioned above on the assumption that the unit of 2×2 pixels is regarded as a polarization unit.

(c) to (g) of FIG. 6 illustrate the color filter. The color filter is a color mosaic filter that has, for example, red, blue, and green (RGB) color components. The color filter is not limited to a case where the RGB color components are in a Bayer arrangement on the assumption that one pixel corresponds to one color component unit as depicted in (c) of FIG. 6. Alternatively, the color filter may be configured so that a set of 2×2 pixels is repeated as one color component unit as depicted in (d) of FIG. 6. Further, the color filter may be configured so that white pixels are repeatedly mixed into the Bayer arrangement as depicted in (e) of FIG. 6. Furthermore, the color filter may be configured so that white pixels are repeatedly mixed into an arrangement of a 2×2 color component unit on the basis of one color component unit having 2×2 pixels as depicted in (f) of FIG. 6. Moreover, the color filter may be configured so that, for example, infrared (IR) pixels are repeatedly mixed as depicted in (g) of FIG. 6 in order to capture images with high-sensitivity even at nighttime or in a dark place.

Figure 7:
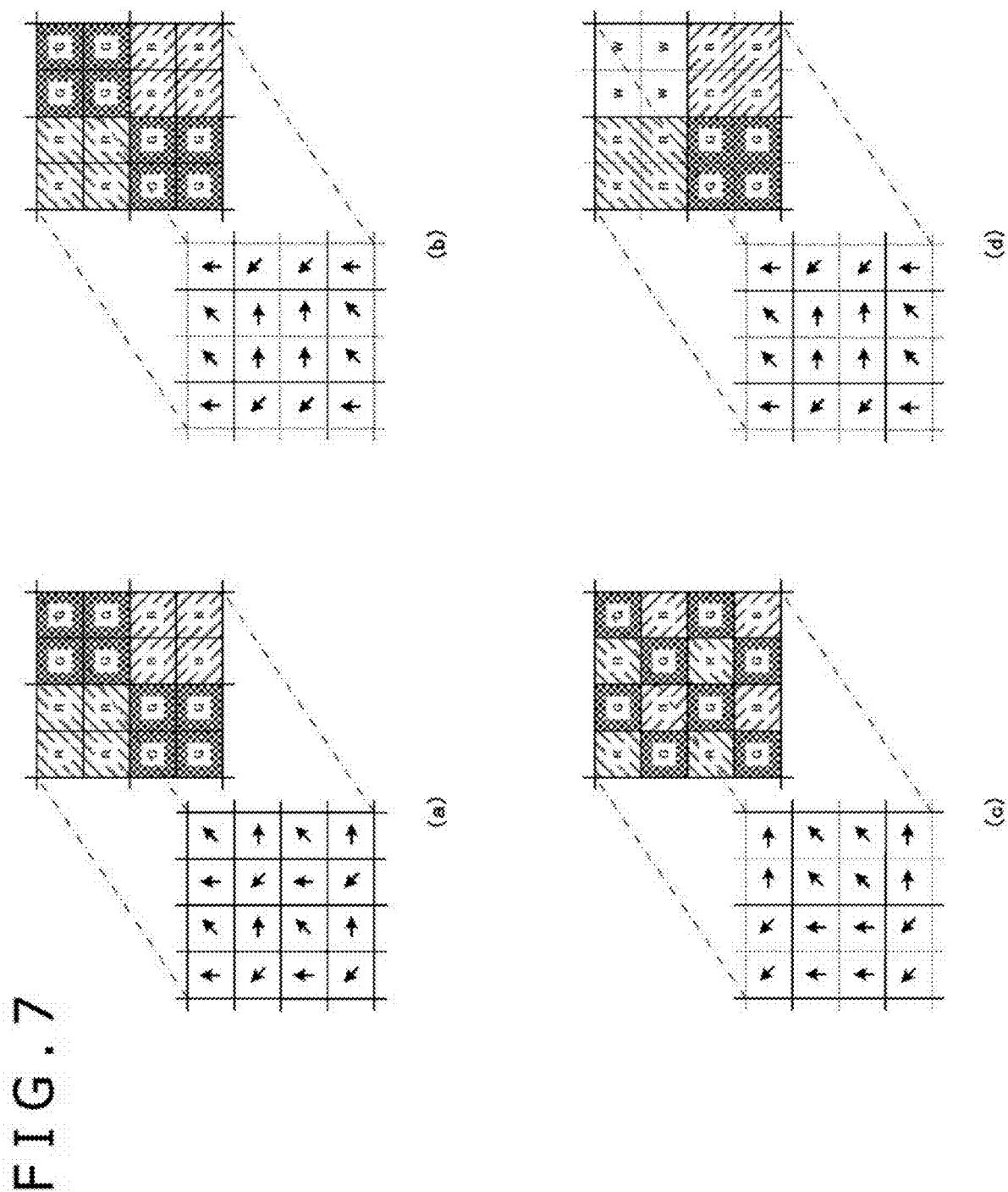
FIG. 7 is a diagram illustrating a combination of the polarizer and the color filter.

The color filter and the polarizer are used in combination in order to acquire four polarized components for each color component. FIG. 7 illustrates a combination of the polarizer and the color filter.

(a) of FIG. 7 illustrates a case where the color filter is configured as depicted in (d) of FIG. 6 and the employed polarizer is configured as depicted in (a) of FIG. 6. This combination is such that each color component unit includes a pixel having a specific polarization direction so as to acquire four polarized components for each color component.

(b) of FIG. 7 illustrates a case where the color filter is configured as depicted in (d) of FIG. 6 and the employed color filter is configured as depicted in (b) of FIG. 6. This combination is such that when a polarized component unit of the polarizer is phase-shifted by only one pixel in the left-right direction and in the up-down direction with respect to a color component unit of the color filter, a pixel having a specific polarization direction is included in each color component unit. As a result, four polarized components can be acquired for each color component.

In a case where the polarized component unit of the polarizer corresponds to a set of 2×2 pixels, the ratio of polarized component leakage from adjacent regions of different polarized component units of polarized components acquired for each polarized component unit is lower than in the case of 1×1 pixel. Further, in a case where a wire grid is used as the polarizer, polarized light having an electric field component perpendicular to the direction of the grid (wire direction) is transmitted so that the longer the wire, the higher the transmittance. Therefore, in a case where the polarized component unit corresponds to a set of 2×2 pixels, the transmittance is higher than in the case of 1×1 pixel. Consequently, the polarized image acquisition section is able to improve the erasure ratio by using the combination depicted in (b) of FIG. 7 as compared with a case where the combination depicted in (a) of FIG. 7 is used. Moreover, in a case where the polarized component unit corresponds to a set of 2×2 pixels, the deviation of pixels in the direction of polarization is greater than in the case of 1×1 pixel. Therefore, the polarized image acquisition section is able to increase the accuracy of the normal line by using the combination depicted in (a) of FIG. 7 as compared with a case where the combination depicted in (b) of FIG. 7 is used.

(c) of FIG. 7 illustrates a case where the color filter is configured as depicted in (c) of FIG. 6 and the employed polarization pattern is configured as depicted in (b) of FIG. 6. This combination is such that a pixel of each color component is included in each polarized component unit. As a result, four polarized components can be acquired for each color component. Further, as the color component unit corresponds to 1×1 pixel, the deviation of color component pixel arrangement is smaller than in the case of 2×2 pixels. Consequently, the polarized image acquisition section is able to provide improved quality by using the combination depicted in (c) of FIG. 7 as compared with a case where the combination depicted, for example, in (a) of FIG. 7 is used.

(d) of FIG. 7 illustrates a case where the color filter is configured as depicted in (f) of FIG. 6 and the employed polarization pattern is configured as depicted in (b) of FIG. 6. This combination is such that when a polarized component unit of the polarization pattern is phase-shifted by only one pixel in the left-right direction and in the up-down direction with respect to a color component unit of the color filter, a pixel having a specific polarization direction is included in each color component unit. As a result, four polarized components can be acquired for each color component. Further, a white pixel is included in a color component unit. Therefore, as compared with a case where the combination depicted, for example, in (b) of FIG. 7 is used, improved sensitivity can be achieved in a case where the employed color filter does not include any white pixel.

The correction information storage section 30 depicted in FIG. 4 stores the variation correction information precalculated by the correction information generation section 50. The variation correction information is, for example, as described later, a correction gain for correcting sensitivity variations, which are caused in polarized images due to the difference in polarization direction, in accordance with the polarized images that are acquired by the polarized image acquisition section 20 when measurement light having uniform intensity is emitted from the measurement light irradiation section to the polarized image acquisition section 20, which acquires polarized images. Further, if the polarized images are color images, the correction information storage section 30 stores variation correction information for each color component.

The correction processing section 40 sets polarized image correction information by using the variation correction information stored in the correction information storage section 30, and uses the set polarized image correction information to perform a correction process on the polarized images acquired by the polarized image acquisition section 20.

The correction information generation section 50 generates variation correction information that is used to correct sensitivity variations or correct sensitivity variations and shading in the polarized image acquisition section 20. The correction information generation section 50 performs a process of generating the variation correction information for each polarization direction in polarized images or performs a process of generating the variation correction information for each pixel in polarized images. The correction information generation section 50 causes the correction information storage section 30 to store the generated variation correction information.

<3. Operation of Correction Processing Section>

An operation of the correction processing section 40 will now be described. The correction processing section 40 performs the correction process on the polarized images acquired by the polarized image acquisition section 20 by adjusting the gain of each pixel in accordance with the polarized image correction information. Equation (3) is a correction equation used during the correction process on the polarized images. In Equation (3), a pixel value Iij is the pixel value of a pixel at a pixel position (i,j) in the polarized images acquired by the polarized image acquisition section 20. A pixel value BK indicates the black level. The same pixel value BK of the black level may be used for the whole screen. Alternatively, the pixel value BK to be used may be measured beforehand for each pixel. It is assumed that the polarized image correction information GAij is a correction gain for a pixel at the pixel position (i,j), and, as indicated, for example, in Equation (4), variation correction information GVij generated beforehand in accordance with the result of sensitivity variation measurement and stored in the correction information storage section 30.

$$Cij=(Iij-BK) \times GAij \qquad (3)$$

$$GAij=GVij \qquad (4)$$

The correction processing section 40 calculates a pixel value Cij, which is obtained by correcting sensitivity variations, by performing computation in Equation (3) on a pixel at the pixel position (i,j) in the polarized images by using the polarized image correction information GAij and the pixel value Iij.

Further, the polarized image correction information is not limited to the correction information for correcting sensitivity variations, but may include correction information for shading correction and white balance correction.

Information for shading correction (hereinafter referred to as the "shading correction information") GS may be measured for each part of an imaging optical system used by the polarized image acquisition section 20 and generated on the basis of the result of measurement, or may be calculated, for example, from lens design data. It should be noted that the shading correction information GS is to be stored in the correction information storage section 30.

When making sensitivity variation correction and shading correction, the correction processing section 40 acquires the variation correction information GVij and shading correction information GSij for a pixel at the pixel position (i,j) in the polarized images from the correction information storage section 30, and sets the polarized image correction information GAij in accordance with Equation (5). Further, the correction processing section 40 calculates the pixel value Cij, which is obtained by making sensitivity variation correction and shading correction, by performing computation, as indicated in Equation (3), on the pixel at the pixel position (i,j) in the polarized images by using the pixel value Iij and the set polarized image correction information GAij.

$$GAij = GVij \times GSij \quad (5)$$

It should be noted that the correction information generation section 50 is able to generate variation correction information including not only sensitivity correction information but also shading correction information. In this case, the correction processing section 40 is able to make sensitivity variation correction and shading correction by setting the variation correction information GVij as the polarized image correction information GAij.

Information for white balance correction (hereinafter referred to as the "white balance correction information") GW may be generated, for example, by adopting a white balance detection mechanism or generated in accordance with illumination settings defined, for example, by a user. Further, the white balance correction information may be generated on the basis of a polarized image. In a case where, for example, luminance values of pixels having four polarization directions are used to perform fitting with respect to a polarization model equation (e.g., cos function) indicative of luminance changes relative to the polarization angle as indicated in FIG. 2, an amplitude change in the polarization model equation after fitting corresponds to a specular reflection component. Therefore, an illumination pixel position can be detected by detecting a pixel position having the highest luminance in each color component. Moreover, correction information for considering the color of the detected illumination pixel position as white is generated and used as the white balance correction information.

When making sensitivity variation correction and white balance correction, the correction processing section 40 sets the polarized image correction information GAij in accordance with Equation (6) by using the variation correction information GVij and white balance correction information GWij for a pixel at the pixel position (i,j) in the polarized images. Further, the correction processing section 40 calculates the pixel value Cij, which is obtained by making sensitivity variation correction and white balance correction, by performing computation, as indicated in Equation (3), on the pixel at the pixel position (i,j) in the polarized images by using the pixel value Iij and the set polarized image correction information GAij.

$$GAij = GVij \times GWij \quad (6)$$

Moreover, when making sensitivity variation correction, shading correction, and white balance correction, the correction processing section 40 calculates the polarized image correction information GAij in accordance with Equation (7) by using the variation correction information GVij, shading correction information GSij, and white balance correction information GWij for a pixel at the pixel position (i,j) in the polarized images. Further, the correction processing section 40 calculates the pixel value Cij, which is obtained by making sensitivity variation correction, shading correction, and white balance correction, by performing computation, as indicated in Equation (3), on the pixel at the pixel position (i,j) in the polarized images by using the pixel value Iij and the set polarized image correction information GAij.

$$GAij = GVij \times GSij \times GWij \quad (7)$$

Figure 8:
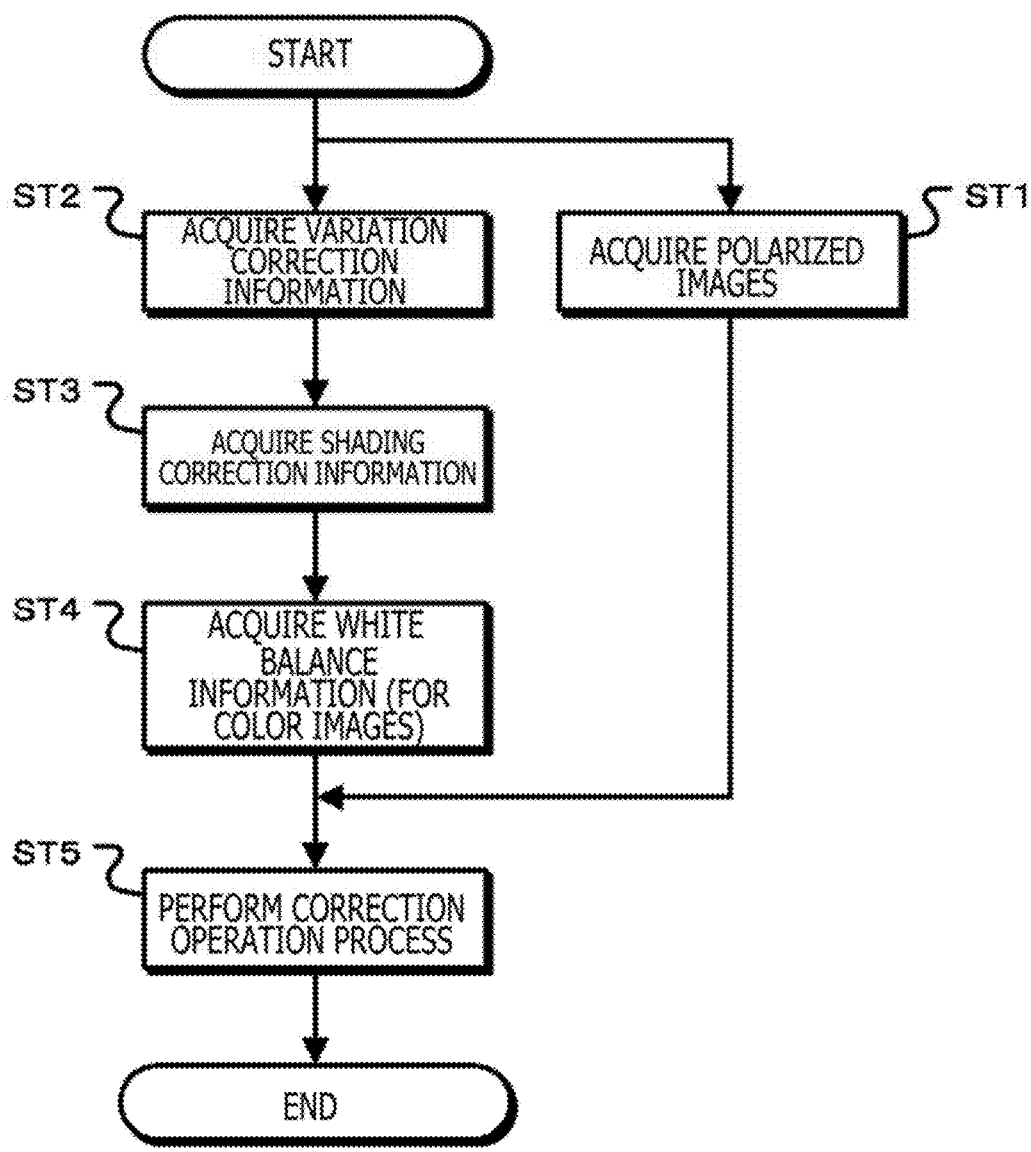
FIG. 8 is a flowchart illustrating an operation of a correction processing section.

FIG. 8 is a flowchart illustrating an operation of the correction processing section. In step ST1, the correction processing section acquires polarized images. After acquiring the polarized images from the polarized image acquisition section 20, the correction processing section 40 proceeds to step ST5. Further, in step ST2, the processing correction section acquires the variation correction information. In a case where the variation correction information for each polarization direction is stored in the correction information storage section 30, the correction processing section 40 acquires the variation correction information regarding the polarization direction of a correction target pixel. In a case where the variation correction information for each pixel is stored in the correction information storage section 30, the correction processing section 40 acquires the variation correction information regarding the pixel position of the correction target pixel. After acquiring the variation correction information regarding the correction target pixel, the correction processing section 40 proceeds to step ST3.

In step ST3, the correction processing section 40 acquires shading correction information. After acquiring the shading correction information regarding the correction target pixel from the correction information storage section 30, the correction processing section 40 proceeds to step ST4.

In step ST4, the correction processing section acquires white balance correction information. After acquiring the white balance correction information generated by the white balance detection mechanism, the white balance correction information depending on illumination settings defined, for example, by the user, or the white balance correction information generated on the basis of polarized images, the correction processing section 40 proceeds to step ST5.

In step ST5, the correction processing section performs a correction computation process. The correction processing section 40 sets the polarized image correction information GAij by using the correction information acquired during the processing in steps ST2 to ST4. Further, the correction processing section 40 generates polarized images, which are subjected to sensitivity variation correction and other corrections, by performing computation as indicated in Equation (3) through the use of the set polarized image correction information GAij.

It should be noted that the processing in steps ST2 to ST4 may be performed by preferentially acquiring any correction information. Further, the processing in step ST3 or ST4 may be performed as needed. In a case where, for example, the variation correction information includes the information for making shading correction, the processing in step ST3 should be omitted. Furthermore, in a case where the polarized images are color images, the processing in step ST4 should be performed. Moreover, the correction processing section 40 may repeat the processing illustrated in FIG. 8 as needed to process all pixels of the polarized images.

Figure 9:
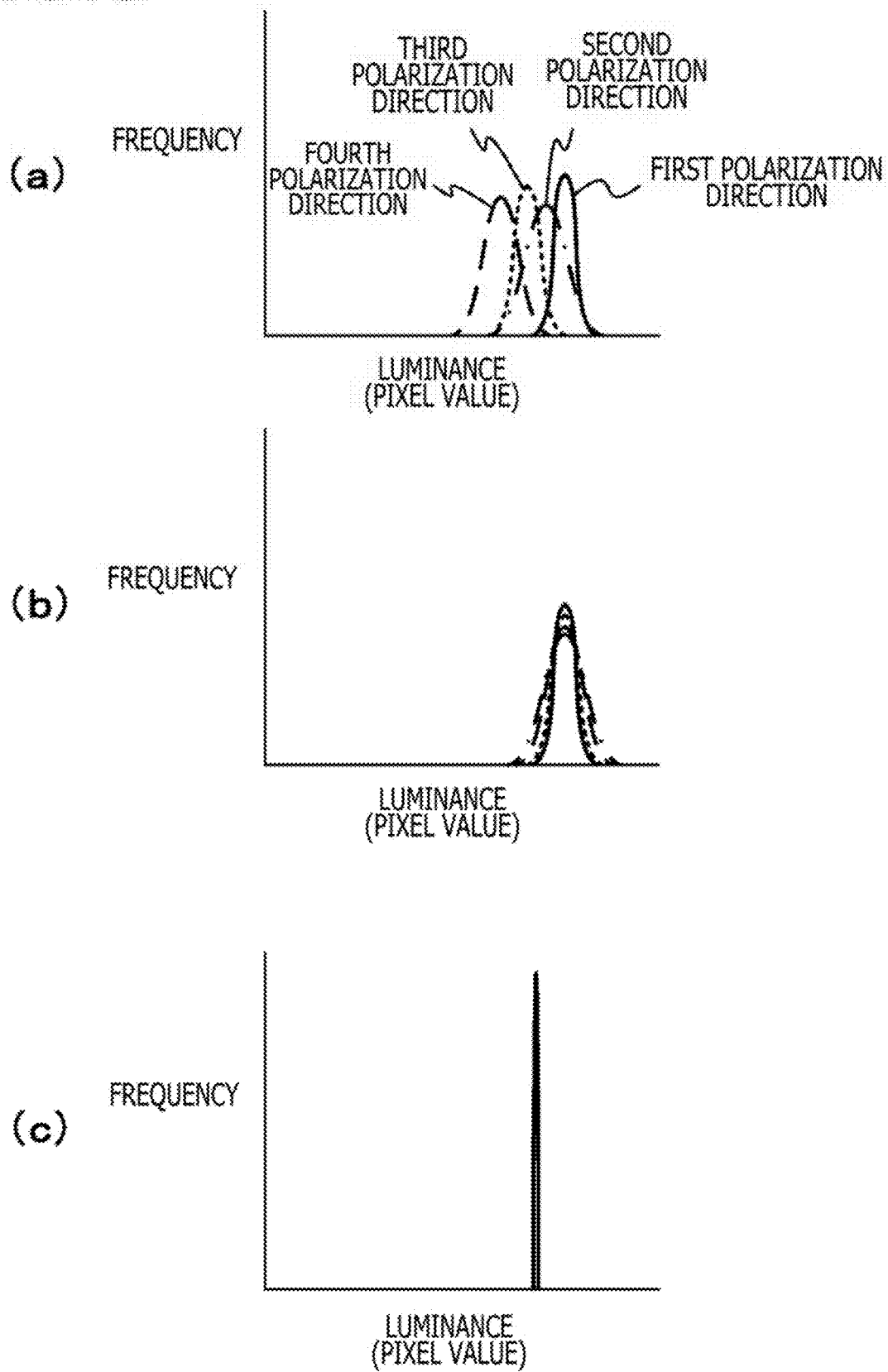
FIG. 9 is a diagram illustrating results of processing by the correction processing section.
Figure 10:
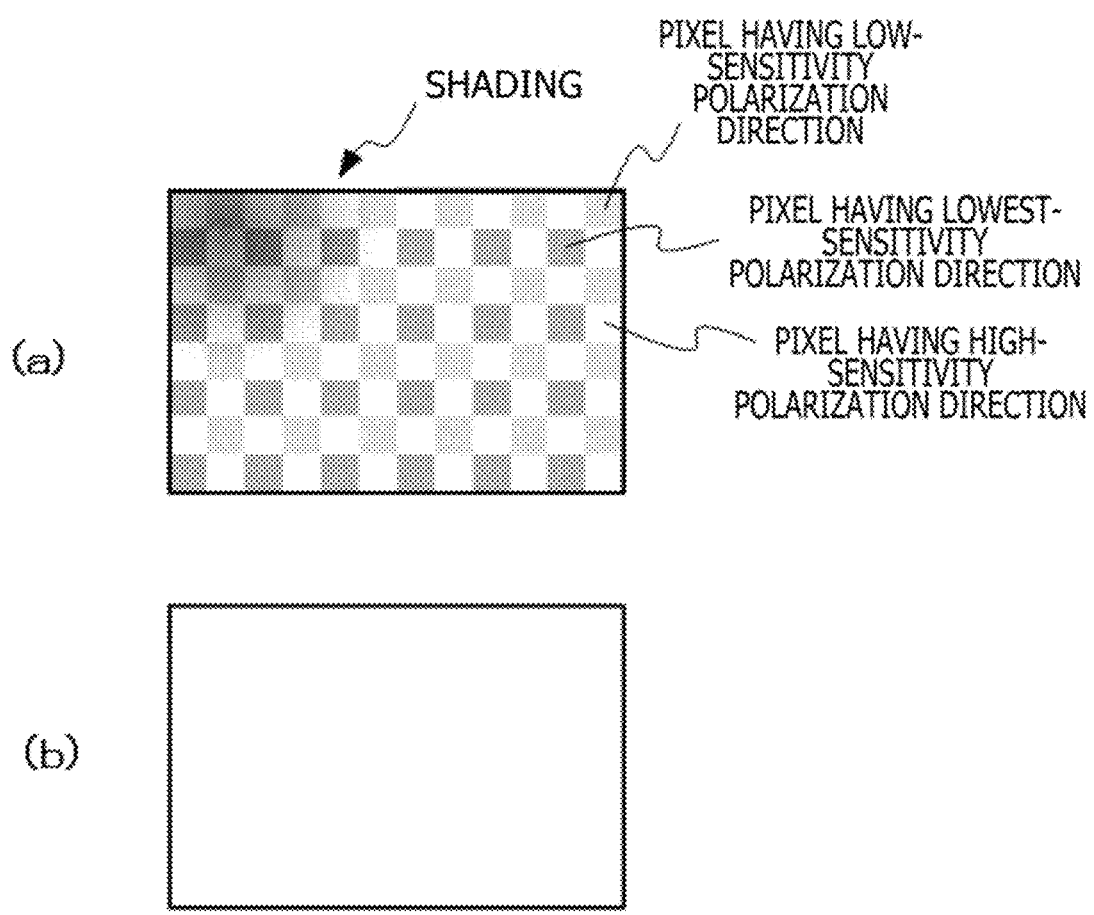
FIG. 10 is a diagram illustrating the results of processing by the correction processing section.

FIGS. 9 and 10 illustrate the results of processing by the correction processing section. (a) of FIG. 9 depicts luminance histograms of polarized images acquired, for example, by emitting unpolarized light onto the polarized image acquisition section 20. It should be noted that the depicted luminance histograms relate to different polarization directions. In some cases, the mean luminance values of the luminance histograms related to different polarization directions may differ from each other due to sensitivity variations caused, for example, by difficulty in polarizer formation.

Here, in a case where the polarized image correction information is calculated for each polarization direction as described later in conjunction with a first embodiment of the correction information generation section, pixel value corrections are made so that different polarization directions are equal in mean luminance value to a polarization direction having the greatest mean luminance value. Therefore, the luminance histograms related to the different polarization directions of processed polarized images are such that the mean luminance values of the different polarization directions are equal to each other as depicted in (b) of FIG. 9.

Further, in a case where the polarized image correction information is calculated for each pixel in accordance with the mean value of all pixels as described later in conjunction with an embodiment of the correction information generation section, pixel value corrections are made so that the pixel value of each pixel is equal to the mean value of all pixels. Therefore, the luminance histograms related to different polarization directions of processed polarized images are such that variations are smaller than indicated in (a) and (b) of FIG. 9 without regard to polarization direction, and thus the mode represents the mean luminance values as depicted in (c) of FIG. 9.

(a) of FIG. 10 illustrates a polarized image that is affected by sensitivity variations and by shading in the upper left corner of a screen when an image of an object having uniform luminance is captured. The correction processing section 40 performs a correction process to correct sensitivity variations and shading by calculating the polarized image correction information GAij in accordance, for example, with Equation (5) above and by using the calculated polarized image correction information GAij. Therefore, as depicted in (b) of FIG. 10, the polarized image subjected to correction processing, which is outputted from the correction processing section 40, is a high-quality polarized image subjected to sensitivity variation correction and shading correction.

As described above, the present technology is able to correct, for example, sensitivity variations in polarized images acquired by the polarized image acquisition section 20. Therefore, high-quality polarized images can be obtained. Further, as high-quality polarized images can be obtained, processing performance deterioration due to sensitivity variations can be avoided while processing is performed, for example, on polarized images.

<4. Generation of Variation Correction Information>

Generation of variation correction information will now be described. The correction information generation section 50 includes the measurement light irradiation section and a correction information generation processing section. The measurement light irradiation section emits measurement light having uniform intensity onto the polarized image acquisition section 20, which acquires polarized images. The correction information generation processing section generates the variation correction information, which corrects sensitivity variations caused in polarized images due to the difference in polarization direction, in accordance with the polarized images that are acquired by the polarized image acquisition section when the measurement light is emitted from the measurement light irradiation section. Further, the correction information generation processing section stores the generated variation correction information in the correction information storage section 30. When the variation correction information is to be generated, it is preferable that measured polarized images be acquired by increasing the exposure time through the use of sufficiently bright measurement light so as to avoid a noise-induced adverse effect. Moreover, the noise in the measured polarized images may be reduced by performing an averaging process on a plurality of acquired polarized images and using the averaged polarized images. When employed measured polarized images are not significantly affected by noise as described above, variation correction information depending on the polarized image acquisition section 20 can be properly generated.

Figure 11:
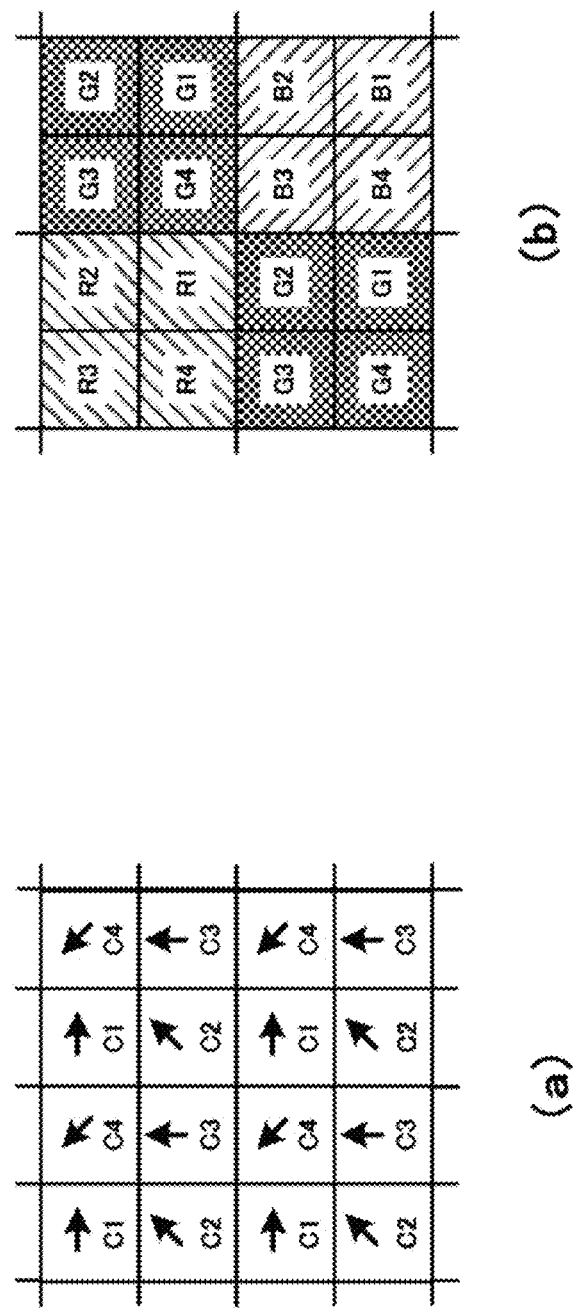
FIG. 11 is a diagram illustrating a part of a measured polarized image acquired by the polarized image acquisition section.

FIG. 11 illustrates a part of a measured polarized image acquired by the polarized image acquisition section. (a) of FIG. 11 depicts a case where the measured polarized image is a monochrome image. (b) of FIG. 11 depicts a case where the measured polarized image is a color image. Further, reference numeral "C1" represents the pixel value of a pixel that is in a measured polarized image and has a first polarization direction. Reference numeral "C2" represents the pixel value of a pixel that is in the measured polarized image and has a second polarization direction. Reference numeral "C3" represents the pixel value of a pixel that is in the measured polarized image and has a third polarization direction. Reference numeral "C4" represents the pixel value of a pixel that is in the measured polarized image and has a fourth polarization direction. Reference numeral "R1" represents the pixel value of a red pixel that is in a measured polarized image and has the first polarization direction. Reference numeral "R2" represents the pixel value of a red pixel that is in the measured polarized image and has the second polarization direction. Reference numeral "R3" represents the pixel value of a red pixel that is in the measured polarized image and has the third polarization direction. Reference numeral "R4" represents the pixel value of a red pixel that is in the measured polarized image and has the fourth polarization direction. Similarly, reference numerals "G1" to "G4" represent the pixel values of green pixels having different polarization directions, and reference numerals "B1" to "B4" represent the pixel values of blue pixels having different polarization directions. It should be noted that the reference numerals "C1" to "C4," "R1" to "R4," "G1" to "G4," and "B1" to "B4" are pixel values that are obtained by excluding a pixel value BK of a black level. Further, the first to fourth polarization directions are defined so as to permit fitting with respect to the polarization model equation. Moreover, in a later-described third embodiment, the polarization directions are set so as to have an angular difference of 90 degrees.

<4-1. First Embodiment of Correction Information Generation Section>

Figure 12:
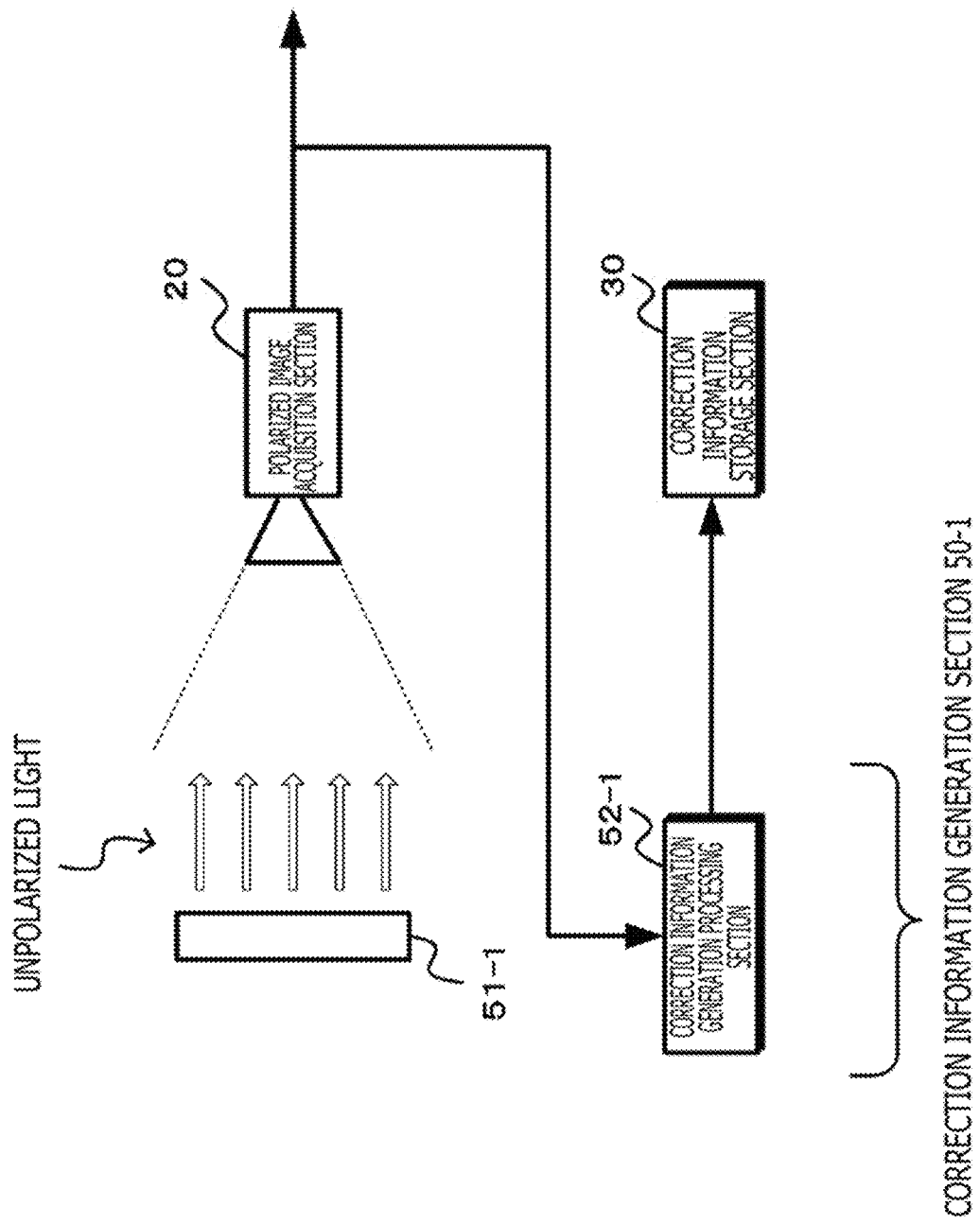
FIG. 12 is a diagram illustrating a first embodiment of a correction information generation section.

FIG. 12 illustrates the first embodiment of the correction information generation section. A measurement light irradiation section 51-1 of a correction information generation section 50-1 uses a light source that emits parallel unpolarized light as the measurement light. A correction information generation processing section 52-1 generates variation correction information from polarized images that are generated when the measurement light irradiation section 51-1 emits the measurement light onto the polarized image acquisition section 20.

Figure 13:
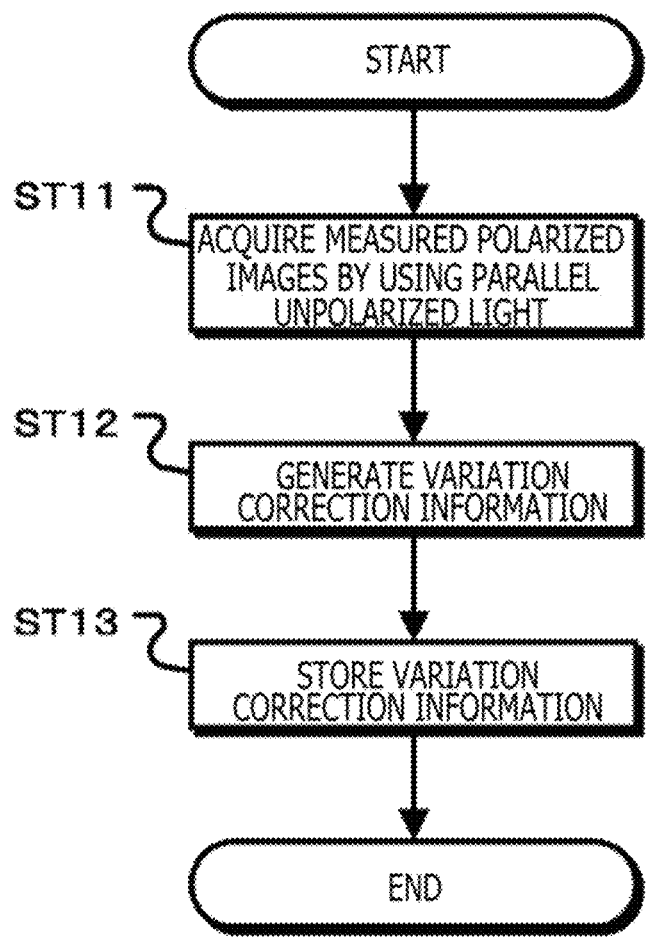
FIG. 13 is a flowchart illustrating an operation according to the first embodiment.

FIG. 13 is a flowchart illustrating an operation according to the first embodiment. In step ST11, the correction information generation section acquires the measured polarized images by using parallel unpolarized light. The correction information generation section 50-1 causes the measurement light irradiation section 51-1 to emit parallel unpolarized light onto the polarized image acquisition section 20, allows the correction information generation processing section 52-1 to acquire the measured polarized images generated by the polarized image acquisition section 20, and then proceeds to step ST12.

In step ST12, the correction information generation section generates variation correction information. On the basis of the acquired measured polarized images, the correction information generation processing section 52-1 in the correction information generation section 50-1 generates the variation correction information indicative of a correction value for each polarization direction or each pixel as described later, and then proceeds to step ST13.

In step ST13, the correction information generation section causes the variation correction information to be stored. The correction information generation processing section 52-1 in the correction information generation section 50-1 causes the correction information storage section 30 to store the generated variation correction information.

Generation of variation correction information will now be described. In a case where parallel unpolarized light is used as illumination light, an ideal measured polarized image is such that the pixel values are equal to each other without regard to polarization direction and pixel position. However, if sensitivity variations occur depending on the polarization direction of the polarizer, pixel value variations occur depending on the polarization direction of a pixel. Therefore, the correction information generation processing section 52-1 in the correction information generation section 50-1 generates variation correction information that indicates a correction value for each polarization direction or each pixel and corrects pixel value variations in the measured polarized images.

In a case where the measured polarized image is a monochrome image, the correction information generation processing section 52-1 calculates a reference pixel value Cbase by performing computation as indicated in Equation (8) or (9) in accordance with the mean pixel value (C1mean, C2mean, C3mean, C4mean) of each polarization direction in the whole or central region of a measured polarized image depicted in FIG. 11A.

$$Cbase=(C1mean+C2mean+C3mean+C4mean)/4 \quad (8)$$

$$Cbase=Max(C1mean,C2mean,C3mean,C4mean) \quad (9)$$

Next, the correction information generation processing section 52-1 generates the variation correction information for each polarization direction by performing computation as indicated in Equations (10) to (13). It should be noted that reference numeral "GVd1" represents a correction gain for the first polarization direction, and that reference numerals "GVd2" to "GVd4" respectively represent correction gains for the second to fourth polarization directions. Further, when Equation (8) is used to calculate the reference pixel value Cbase, the calculated reference pixel value Cbase is less susceptible to the influence, for example, of noise than when Equation (9) is used. Moreover, when Equation (9) is used to calculate the reference pixel value Cbase, the value of the correction gain is not smaller than "1." Therefore, performing the correction process by using the variation correction information does not decrease the pixel values or desaturate saturated pixel values.

$$GVd1=Cbase/C1mean \quad (10)$$

$$GVd2=Cbase/C2mean \quad (11)$$

$$GVd3=Cbase/C3mean \quad (12)$$

$$GVd4=Cbase/C4mean \quad (13)$$

In a case where the measured polarized image is a color image, the correction information generation processing section 52-1 performs similar processing in accordance with the measured polarized image depicted in FIG. 11B. When generating the variation correction information regarding, for example, a red pixel, the correction information generation processing section 52-1 calculates the reference pixel value Cbase as indicated in Equation (14) or (15) in accordance with the mean pixel value (R1mean, R2mean, R3mean, R4mean) of each polarization direction of the red pixel in the whole or central region of the measured polarized image.

$$Rbase=(R1mean+R2mean+R3mean+R4mean)/4 \quad (14)$$

$$Rbase=Max(R1mean,R2mean,R3mean,R4mean) \quad (15)$$

Next, the correction information generation processing section 52-1 generates the variation correction information for each polarization direction of the red pixel by performing computation as indicated in Equations (16) to (19). It should be noted that reference numeral "GVd1R" represents a correction gain for the first polarization direction of the red pixel, and that reference numerals "GVd2R" to "GVd4R" respectively represent correction gains for the second to fourth polarization directions of the red pixel.

$$GVd1R=Rbase/R1mean \quad (16)$$

$$GVd2R=Rbase/R2mean \quad (17)$$

$$GVd3R=Rbase/R3mean \quad (18)$$

$$GVd4R=Rbase/R4mean \quad (19)$$

Further, the correction information generation processing section 52-1 additionally generates the variation correction information for each polarization direction of a green pixel and the variation correction information for each polarization direction of a blue pixel by performing processing on the green and blue pixels in a similar manner to the case of the red pixel.

Furthermore, in a case where the variation correction information for each pixel is to be generated, the correction information generation processing section 52-1 performs computation on each pixel as indicated in Equation (20).

$$GVij=Cbase/Cij \quad (20)$$

In a case where the measured polarized image is a color image, the correction information generation processing section 52-1 performs similar processing on each color in accordance with the measured polarized image depicted in FIG. 11B. When generating the variation correction information regarding, for example, a red pixel, the correction information generation processing section 52-1 performs computation on each pixel as indicated in Equation (21).

$$GVRij=Rbase/Rij \quad (21)$$

Moreover, the correction information generation processing section 52-1 additionally generates the variation correction information GVGij for each green pixel and the variation correction information GVBij for each polarization direction of a blue pixel by performing processing on the green and blue pixels in a similar manner to the case of the red pixel. The correction information generation processing section 52-1 causes the correction information storage section 30 to store the generated variation correction information.

<4-2. Second Embodiment of Correction Information Generation Section>

Figure 14:
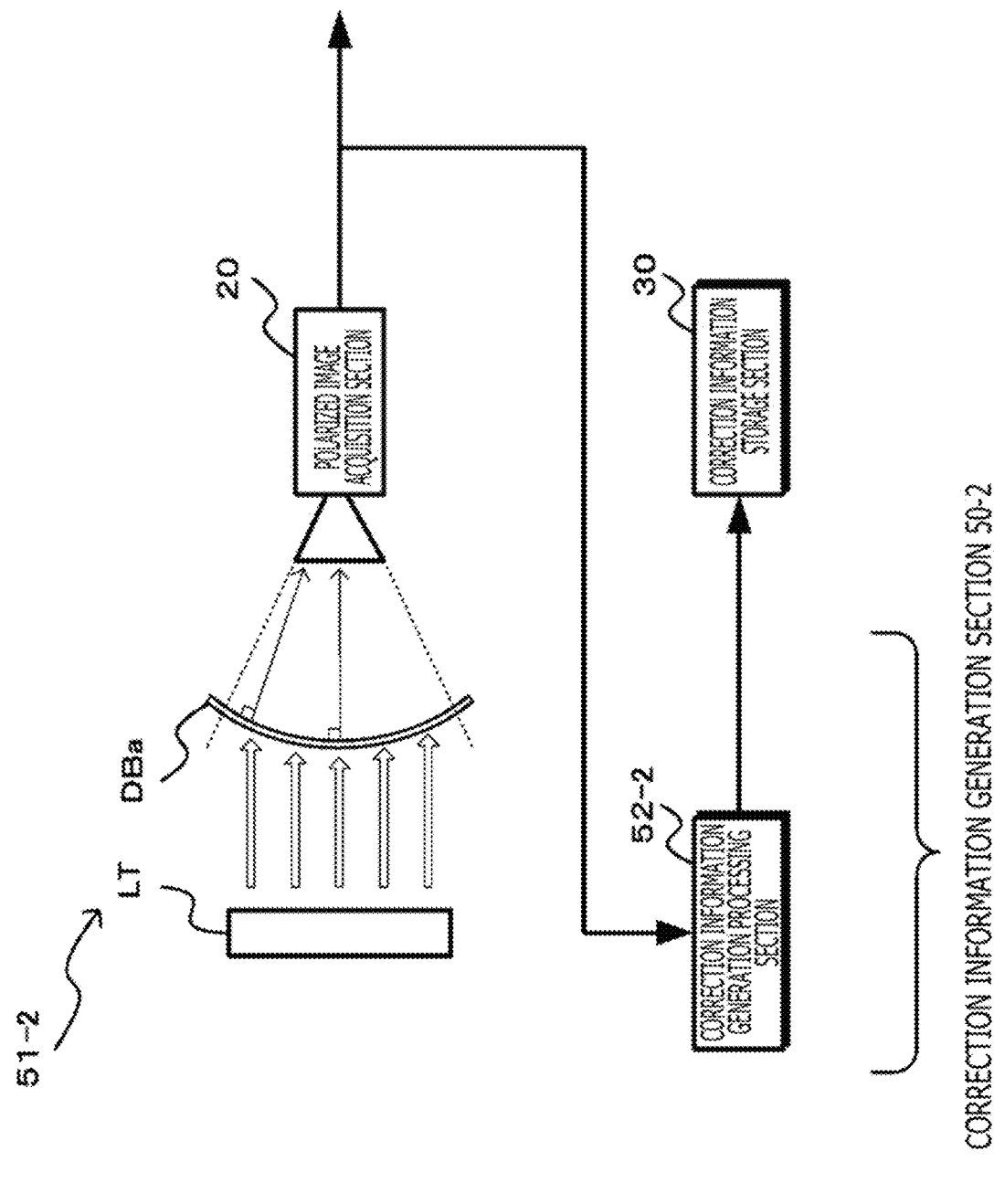
FIG. 14 is a diagram illustrating a second embodiment of the correction information generation section.

FIG. 14 is a diagram illustrating a second embodiment of the correction information generation section. A measurement light irradiation section 51-2 in a correction information generation section 50-2 includes a spherical diffusion plate DBa and the light source LT. The spherical diffusion plate DBa of the measurement light irradiation section 51-2 is configured so that the spherical center coincides with the principal point of the polarized image acquisition section 20, and that the measurement light incident on the polarized image acquisition section 20 through the spherical diffusion plate DBa has a zenith angle θ of 0 (zero) at any point of the spherical diffusion plate DBa. On the basis of the polarized images generated when the measurement light irradiation section 51-2 emits the measurement light onto the polarized image acquisition section 20, a correction information generation processing section 52-2 generates the variation correction information.

Figure 15:
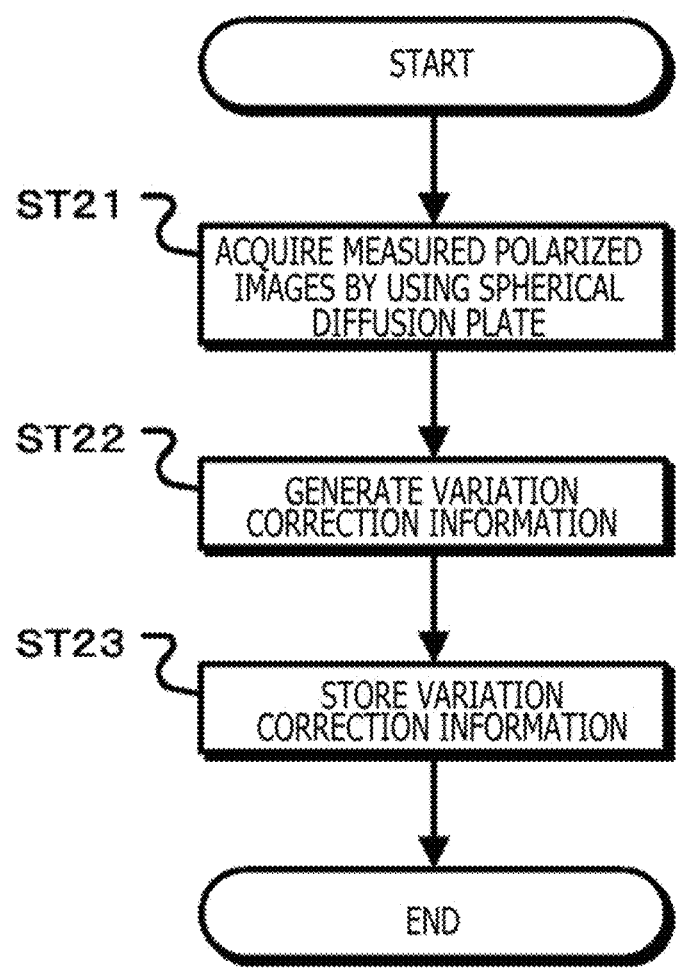
FIG. 15 is a flowchart illustrating an operation according to the second embodiment.

FIG. 15 is a flowchart illustrating an operation according to the second embodiment. In step ST21, the correction information generation section acquires measured polarized images by using the spherical diffusion plate. The measurement light irradiation section 51-2 in the correction information generation section 50-2 emits the measurement light onto the correction information generation section 50-2 through the spherical diffusion plate DBa. The correction information generation processing section 52-2 in the correction information generation section 50-2 acquires the measured polarized images generated by the polarized image acquisition section 20, and then proceeds to step ST22.

In step ST22, the correction information generation section generates the variation correction information. In a case where illumination is provided in such a manner that the zenith angle θ is 0 (zero), the minimum luminance Imin is equal to the maximum luminance Imax, as mentioned earlier. More specifically, in a case where no sensitivity variations occur, the pixel values are equal to each other without regard to the polarization direction. Therefore, on the basis of the acquired measured polarized images, the correction information generation processing section 52-2 in the correction information generation section 50-2 generates the variation correction information indicative of a correction value for each polarization direction or each pixel as described later, and then proceeds to step ST23.

In step ST23, the correction information generation section causes the variation correction information to be stored. The correction information generation processing section 52-2 in the correction information generation section 50-2 causes the correction information storage section 30 to store the generated variation correction information.

Generation of variation correction information will now be described. In a case where illumination is provided in such a manner that the zenith angle θ is 0 (zero), the ideal measured polarized image acquired by the polarized image acquisition section 20 is such that the pixel values are equal to each other without regard to polarization direction and pixel position. However, if sensitivity variations occur depending on the polarization direction of the polarizer, pixel value variations occur depending on the polarization direction of a pixel. Therefore, the correction information generation processing section 52-2 in the correction information generation section 50-2 generates variation correction information that indicates a correction value for each polarization direction or each pixel and corrects pixel value variations in the measured polarized images.

In a case where the measured polarized image is a monochrome image, the correction information generation processing section 52-2 generates the variation correction information for each polarization direction by performing computation as indicated in Equations (8) to (13) as is the case with the first embodiment on the basis of the measured polarized image depicted in (a) of FIG. 11. Meanwhile, in a case where the measured polarized image is a color image, the correction information generation processing section 52-2 performs similar processing on each color in accordance with the measured polarized image depicted in (b) of FIG. 11. In a case where the variation correction information regarding, for example, a red pixel, the correction information generation processing section 52-2 generates the variation correction information for each polarization direction of the red pixel by performing computation as indicated in Equations (14) to (19), as is the case with the first embodiment. Further, the correction information generation processing section 52-2 generates the variation correction information for each polarization direction of a green pixel and the variation correction information for each polarization direction of a blue pixel by performing processing on the green and blue pixels in a similar manner to the case of the red pixel.

Furthermore, if the measured polarized image is a monochrome image in a case where the variation correction information for each pixel is to be generated, the correction information generation processing section 52-2 performs computation on each pixel as indicated in Equation (20). Meanwhile, if the measured polarized image is a color image, the correction information generation processing section 52-2 performs computation on each pixel as indicated in Equation (21). Moreover, the correction information generation processing section 52-2 generates the variation correction information for each green pixel and the variation correction information for each polarization direction of a blue pixel by performing processing on the green and blue pixels in a similar manner to the case of the red pixel.

<4-3. Third Embodiment of Correction Information Generation Section>

Figure 16:
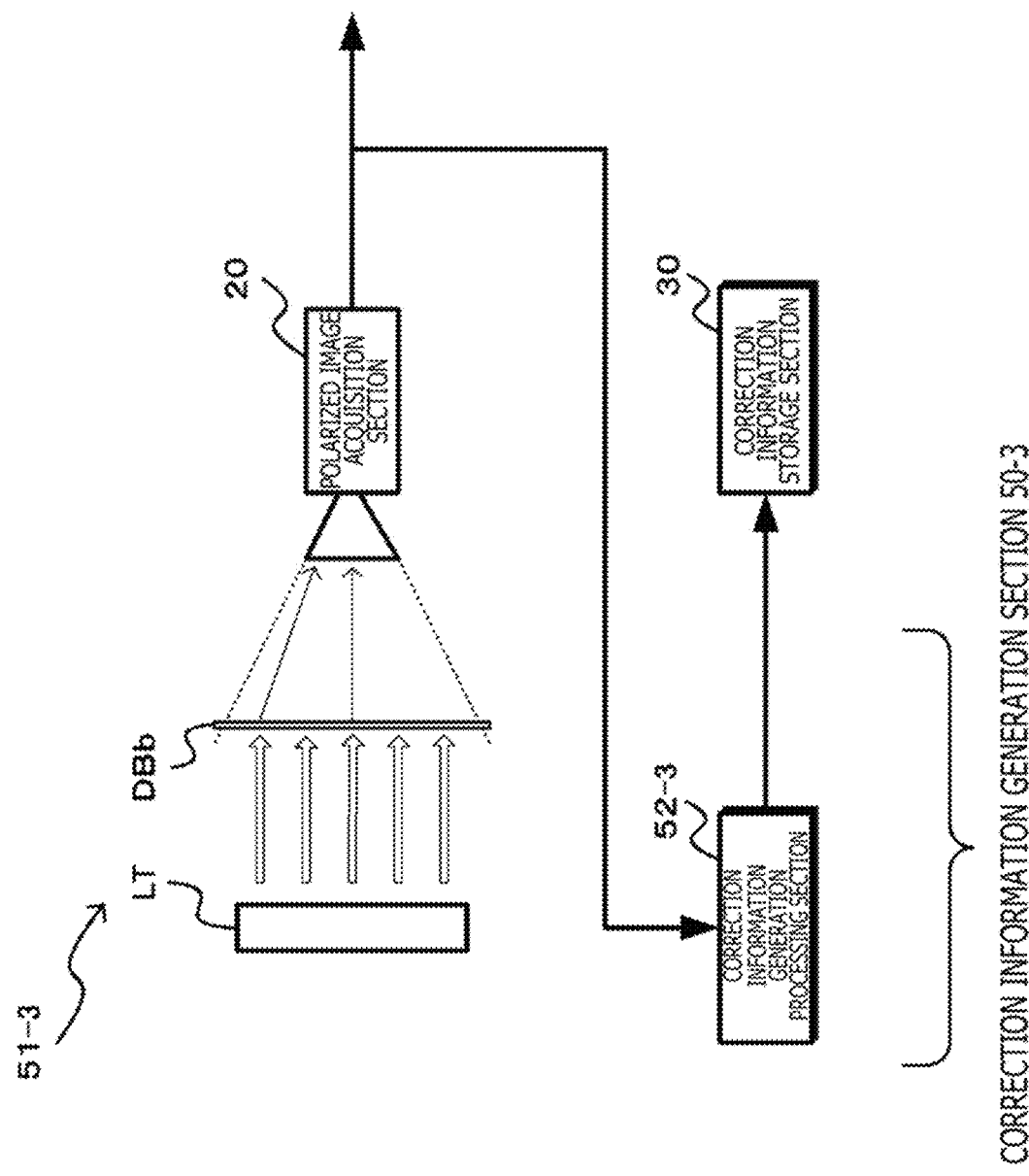
FIG. 16 is a diagram illustrating a third embodiment of the correction information generation section.

FIG. 16 is a diagram illustrating a third embodiment of the correction information generation section. A measurement light irradiation section 51-3 in a correction information generation section 50-3 includes a flat diffusion plate DBb and the light source LT. On the basis of focal length information and optical axis center information regarding the polarized image acquisition section 20, a correction information generation processing section 52-3 generates correction information by using polarized images that are generated when the measurement light irradiation section 51-3 emits measurement light onto the polarized image acquisition section 20 through the flat diffusion plate.

Figure 17:
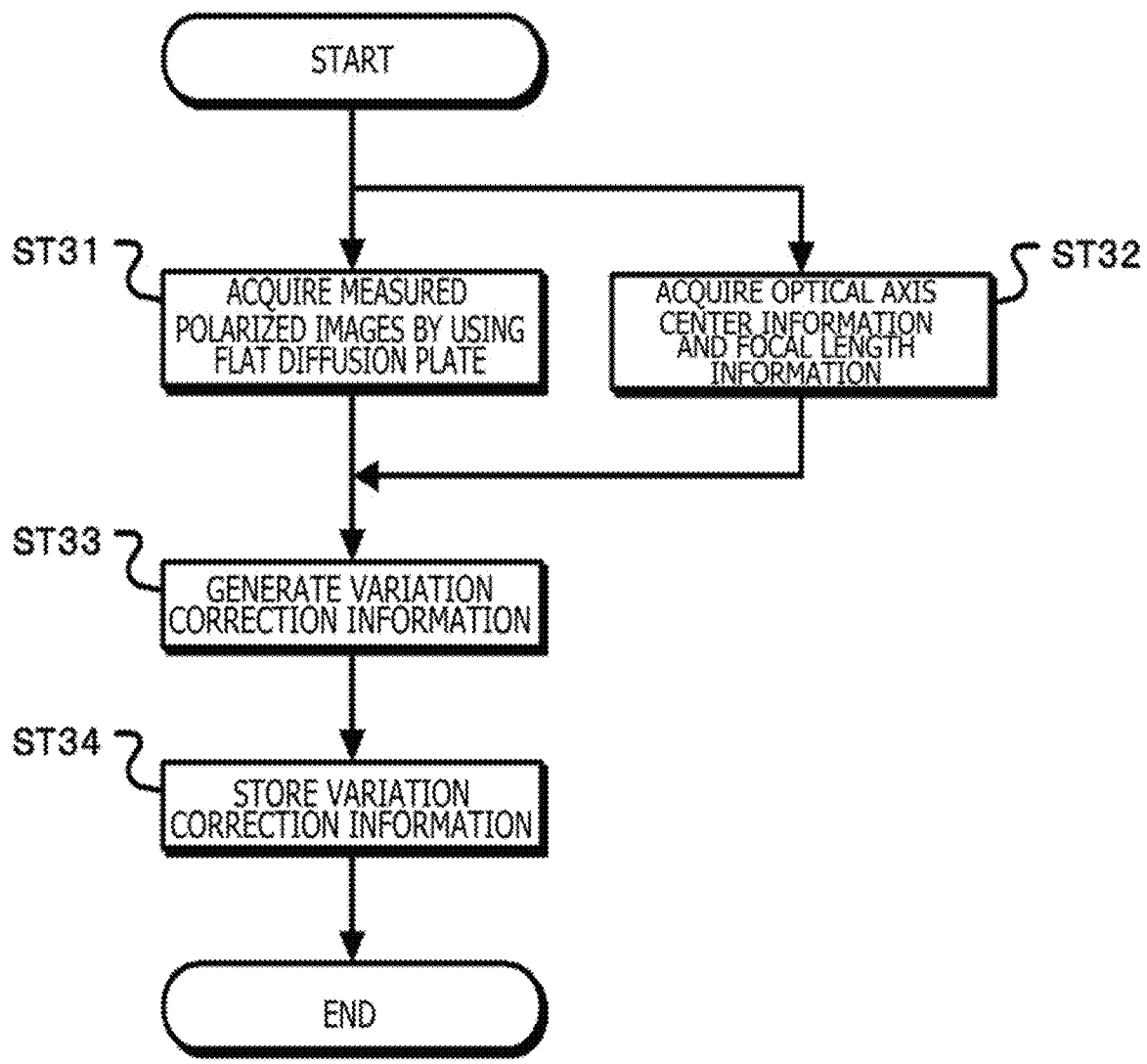
FIG. 17 is a flowchart illustrating an operation according to the third embodiment.

FIG. 17 is a flowchart illustrating an operation according to the third embodiment. In step ST31, the correction information generation section acquires measured polarized images by using the flat diffusion plate. The correction information generation processing section 52-3 in the correction information generation section 50-3 emits the measurement light onto the correction information generation section 50-3 through the flat diffusion plate DBb. The correction information generation processing section 52-3 in the correction information generation section 50-3 acquires the measured polarized images generated by the polarized image acquisition section 20, and then proceeds to step ST33.

In step ST32, the correction information generation section acquires the optical axis center information and the focal length information. After acquiring the optical axis information, which indicates the position of an optical axis center, and the focal length information, which indicates the focal length at the time of image capturing of the flat diffusion plate, the correction information generation processing section 52-3 in the correction information generation section 50-3 proceeds to step ST33. It should be noted that the optical axis information and the focal length information may be inputted by the user or pre-acquired from the characteristics of an imaging optical system used by the polarized image acquisition section 20, and then stored in the correction information generation processing section 52-3. Another alternative is to perform calibration to acquire the optical axis center information and the focal length information. It should be noted that the processing in step ST32 may be performed only in a case where the correction information for each pixel is to be generated.

In step ST33, the correction information generation section generates variation correction information. On the basis of the acquired measured polarized images, the correction information generation processing section 52-2 in the correction information generation section 50-2 generates the variation correction information indicative of a correction value for each polarization direction or each pixel as described later, and then proceeds to step ST34.

In step ST34, the correction information generation section causes the variation correction information to be stored. The correction information generation processing section 52-3 in the correction information generation section 50-3 causes the correction information storage section 30 to store the generated variation correction information.

Generation of variation correction information will now be described. In a region near the optical axis center of a measured polarized image, the zenith angle θ is nearly equal to 0 (zero). Meanwhile, the zenith angle θ is large at an angle of view apart from an optical axis. Further, in a case where the zenith angle θ is nearly equal to 0 (zero), the minimum luminance Imin and the maximum luminance Imax may be considered to be substantially equal. More specifically, in a case where no sensitivity variations occur, the pixel values are substantially equal to each other without regard to the polarization direction. Therefore, on the basis of an image of the region near the optical axis center of a measured image, the correction information generation processing section 52-3 in the correction information generation section 50-3 generates the variation correction information indicative of a correction value for each polarization direction.

In a case where the measured polarized image is a monochrome image, on the basis of the measured polarized image depicted in (a) of FIG. 11, the correction information generation processing section 52-3 generates the variation correction information for each polarization direction by performing computation as indicated in Equations (8) to (13), as is the case with the first embodiment. Meanwhile, in a case where the measured polarized image is a color image, on the basis of the measured polarized image depicted in (b) of FIG. 11, the correction information generation processing section 52-3 performs similar processing on each color. In a case where, for example, the variation correction information regarding a red pixel is to be generated, the correction information generation processing section 52-3 generates the variation correction information for each polarization direction of the red pixel by performing computation as indicated in Equations (14) to (19), as is the case with the first embodiment. Further, the correction information generation processing section 52-3 generates the variation correction information for each polarization direction of a green pixel and the variation correction information for each polarization direction of a blue pixel by performing processing on the green and blue pixels in a similar manner to the case of the red pixel.

Figure 18:
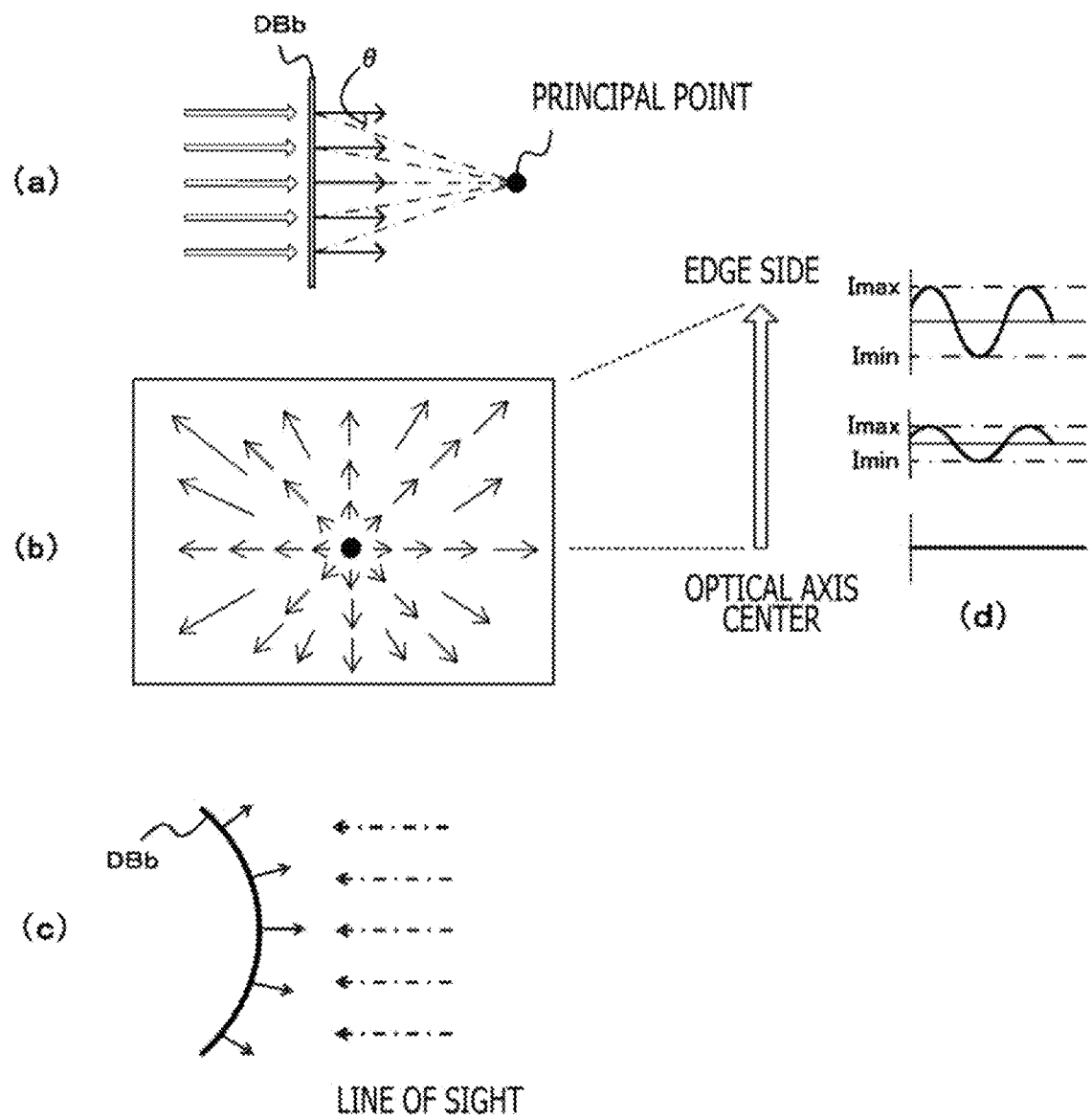
FIG. 18 is a diagram illustrating a case where the polarized image acquisition section captures an image of a flat diffusion plate.

A case where the variation correction information is to be generated for each pixel will now be described. FIG. 18 illustrates a case where the polarized image acquisition section captures an image of the flat diffusion plate. When a pixel position in a measured polarized image is away from the optical axis center of the polarized image acquisition section 20, the gradient of the normal line (zenith angle θ) is high. (a) of FIG. 18 depicts the relationship between the flat diffusion plate DBb and the principal point, that is, the center of the imaging optical system in the polarized image acquisition section 20 from a viewpoint in a direction orthogonal to the direction of the optical axis of the imaging optical system in the polarized image acquisition section 20. Meanwhile, (b) of FIG. 18 depicts the relationship from a viewpoint in the direction of the optical axis. It should be noted that (c) of FIG. 18 depicts a normal direction when viewpoint directions of pixels in the measured polarized image are parallel to each other.

As described above, the gradient of the normal line varies with pixels in the measured polarized image, and increases when the pixel position moves outward from the optical axis center. More specifically, the zenith angle θ is such that the difference between the minimum luminance Imin and the maximum luminance Imax increases as the pixel position moves outward from the optical axis center, as described in (d) of FIG. 18.

Consequently, the correction information generation processing section 52-3 calculates the normal line to be observed at a correction target pixel position from the optical axis center position, the focal length, and the correction target pixel position, and applies the calculated normal line to the polarization model equation. Further, the correction information generation processing section 52-3 sets a reference value (Imax+Imin)/2 from a pixel value near the optical axis center, applies the reference value to the polarization model equation, calculates an ideal luminance value, and generates the variation correction information regarding the correction target pixel position.

Figure 19:
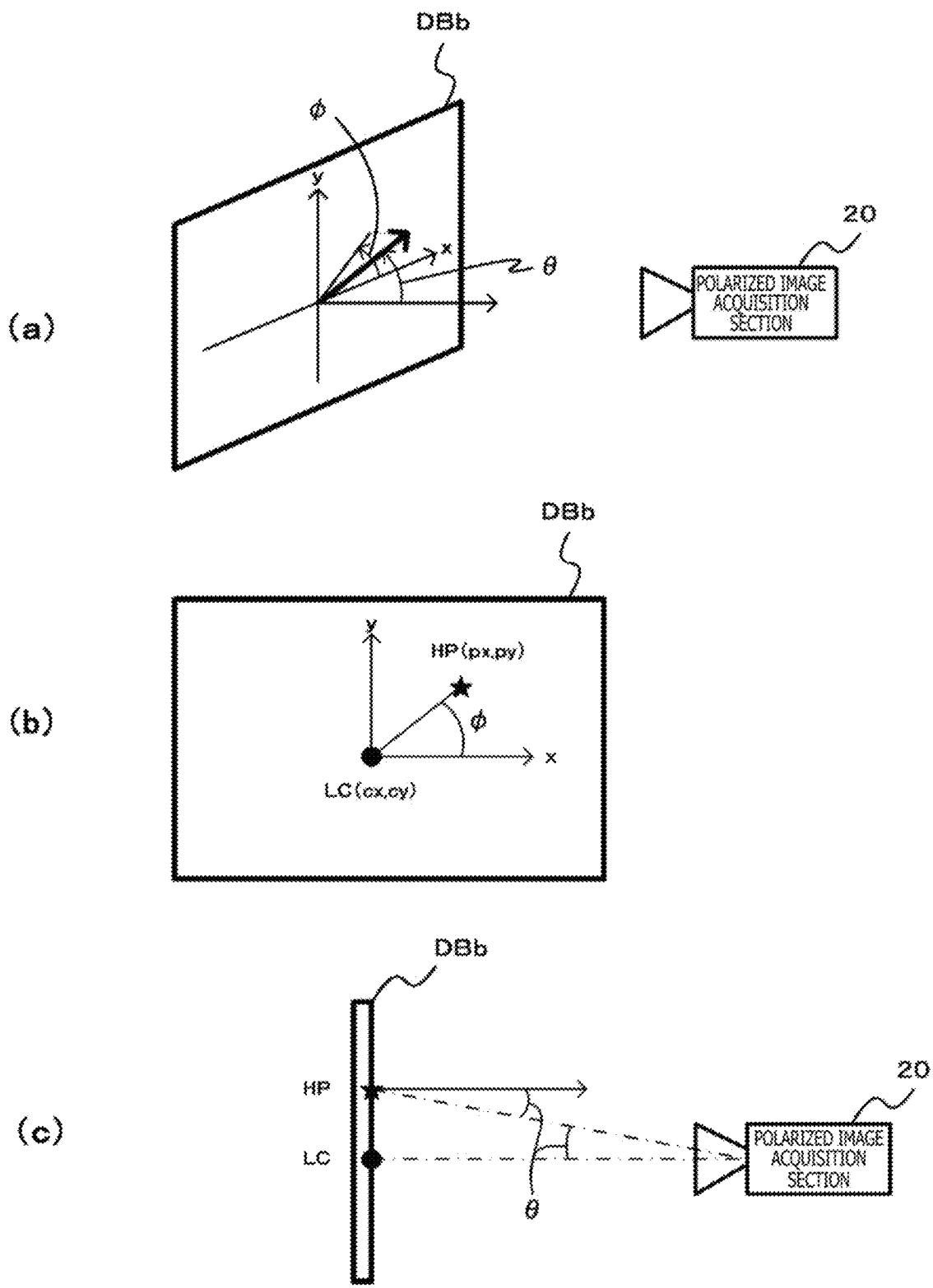
FIG. 19 is a diagram illustrating calculation of a normal line.

FIG. 19 is a diagram illustrating the calculation of the normal line. (a) of FIG. 19 depicts the arrangement of the polarized image acquisition section 20 and the flat diffusion plate DBb. (b) of FIG. 19 depicts the azimuth angle φ. (C) of FIG. 19 depicts the zenith angle θ. Further, it is assumed in FIG. 19 that the optical axis center LC is at coordinates (Cx,Cy), and that the correction target pixel HP is at coordinates (Hx,Hy). The focal length fm (expressed in mm) can be converted to a focal length f in the unit of a pixel in accordance with Equation (22). It should be noted that "ps" in Equation (22) denotes the pixel size of a pixel (expressed in mm/pixel).

$$f = fm/ps \tag{22}$$

The azimuth angle φ of the correction target pixel HP can be calculated from Equation (23). Further, the zenith angle θ of the correction target pixel HP can be calculated from Equation (24).

[Math. 3]

$$\phi = \arctan\left(\frac{H_y - c_y}{H_x - c_x}\right) \tag{23}$$

$$\theta = \arctan\left(\frac{\sqrt{(H_x - c_y)^2 + (H_y - c_y)^2}}{f}\right) \tag{24}$$

Furthermore, in a case where illumination is provided from the rear of the flat diffusion plate in order to emit the measurement light onto the polarized image acquisition section 20, the measurement light can be regarded as diffuse reflection light, which, in principle, does not cause specular reflection. The correction information generation processing section 52-3 performs fitting with respect to the polarization model equation represented by Equation (1) by using the pixel values of a polarized image that is acquired by the polarized image acquisition section 20 when the measurement light is emitted. Moreover, Equation (1) can be represented by Equation (25), and the polarization degree ρ in Equation (25) can be calculated from Equation (2).

[Math. 4]

$$I_{pol} = \frac{I_{max} + I_{min}}{2}(1 + \rho\cos 2(\upsilon_{pol} - \phi)) \quad (25)$$

Additionally, as the zenith angle θ is calculated from Equation (24), the polarization degree ρ is calculated from Equation (26). It should be noted that Equation (26) is known as the equation indicative of the polarization degree of diffuse reflection light. It is assumed that a refractive index n represents the refractive index of the flat diffusion plate.

[Math. 5]

$$\rho = \frac{(n - 1/n)^2 \sin^2\theta}{2 + 2n^2 - (n + 1/n)^2 \sin^2\theta + 4\cos\theta\sqrt{n^2 - \sin^2\theta}} \quad (26)$$

When arithmetic processing is performed as described above, the polarization angle vpol indicative of the polarization direction of the correction target pixel HP, the azimuth angle φ, and the polarization degree ρ are known values in the polarization model equation. Therefore, ((Imax+Imin)/2) is estimated so that the ideal luminance lpol of the correction target pixel HP is made calculable.

In the estimation of ((Imax+Imin)/2), the mean value of pixel values differing in polarization direction by 90 degrees is assumed to be an estimated value. Equation (27) represents the addition of two pixel values lpol, lpol+90 that differ in polarization direction by 90 degrees. It is obvious from Equation (27) that (Imax+Imin) is the result of addition of the pixel value lpol and the pixel value lpol+90.

[Math. 6]

$$\begin{aligned} I_{pol} + I_{pol+90} &= \frac{I_{max} + I_{min}}{2} + \frac{I_{max} - I_{min}}{2}\cos 2(\upsilon_{pol} - \phi) + \\ &\quad \frac{I_{max} + I_{min}}{2} + \frac{I_{max} - I_{min}}{2}\cos 2(\upsilon_{pol} + 90 - \phi) \\ &= I_{max} + I_{min} + \frac{I_{max} - I_{min}}{2}\cos 2(\upsilon_{pol} - \phi) + \\ &\quad \frac{I_{max} - I_{min}}{2}\cos\{2(\upsilon_{pol} - \phi) + 180\} \\ &= I_{max} + I_{min} + \frac{I_{max} - I_{min}}{2}\cos 2(\upsilon_{pol} - \phi) - \\ &\quad \frac{I_{max} - I_{min}}{2}\cos 2(\upsilon_{pol} - \phi) \\ &= I_{max} + I_{min} \end{aligned} \quad (27)$$

Consequently, the correction information generation processing section 52-3 can use the mean pixel value of pixels differing in polarization direction by 90 degrees as the estimated value of ((Imax+Imin)/2). Further, in the estimation of ((Imax+Imin)/2), pixels differing in polarization direction by 90 degrees in a region near the optical axis center are used to eliminate the influence of the zenith angle θ.

More specifically, the correction information generation processing section 52-3 performs computation as indicated in Equation (28) by using the same number of pixel values for each polarization direction (m pixel values having the i-direction and m pixel values having the j-direction) in the region near the optical axis center, and regards the calculated mean value as the estimated value ((Imax+Imin)/2)base.

[Math. 7]

$$\left(\frac{I_{max} + I_{min}}{2}\right)_{base} = \frac{\sum_{i,j}^m c1_{ij} + \sum_{i,j}^m c2_{ij} + \sum_{i,j}^m c3_{ij} + \sum_{i,j}^m c4_{ij}}{4m} \quad (28)$$

Further, the correction information generation processing section 52-3 calculates the ideal luminance value ID by performing computation as indicated in Equation (29) by using the polarization angle vpol indicative of the polarization direction of the correction target pixel HP, the azimuth angle φ of the correction target pixel HP, the polarization degree ρ, and the estimated value ((Imax+Imin)/2)base.

[Math. 8]

$$ID = \left(\frac{I_{max} + I_{min}}{2}\right)_{base}(1 + \rho\cos 2(\upsilon_{pol} - \phi)) \quad (29)$$

Moreover, the correction information generation processing section 52-3 generates the variation correction information GVij by using Equation (30) in accordance with the pixel value Cij of the correction target pixel HP at the pixel position (i,j) and with the ideal luminance value IDij.

$$GVij = IDij/Cij \quad (30)$$

As described above, the correction information generation processing section 52-3 regards each pixel of a polarized image as the correction target pixel, generates the correction information GV for each pixel, and causes the correction information storage section 30 to store the generated correction information GV.

Meanwhile, in a case where a telecentric optical system is used as the imaging optical system of the polarized image acquisition section 20, each pixel faces the diffusion plate no matter whether the flat diffusion plate or the spherical diffusion plate is used. Therefore, in a case where the flat diffusion plate and the telecentric optical system are used, the variation correction information may be generated in a similar manner to the second embodiment.

<4-4. Fourth Embodiment of Correction Information Generation Section>

Figure 20:
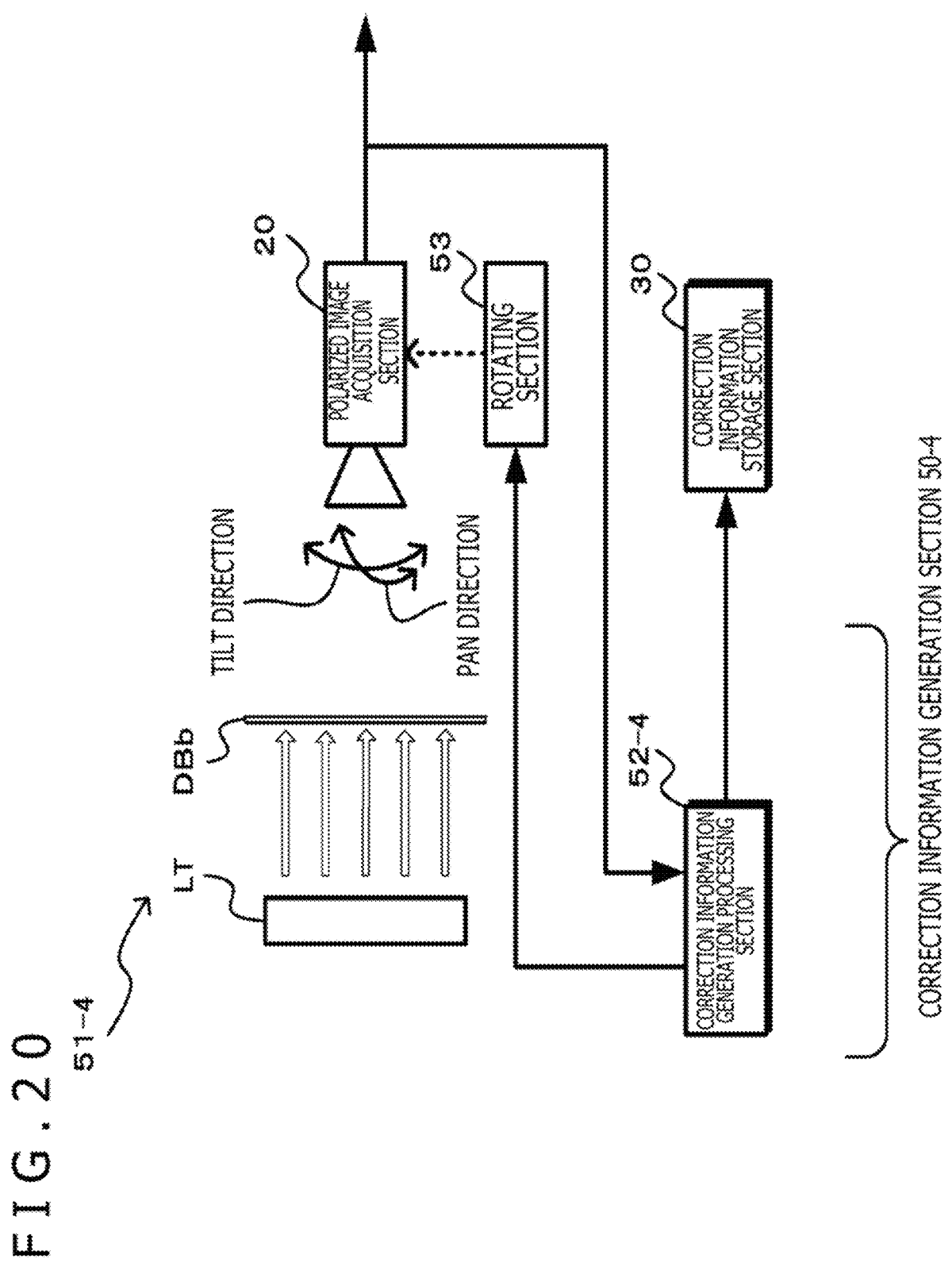

FIG. 20 is a diagram illustrating a fourth embodiment of the correction information generation section. A measurement light irradiation section 51-4 in a correction information generation section 50-4 operates so that the illumination light from the light source LT is incident on the polarized image acquisition section 20 through the flat diffusion plate DBb. A correction information generation processing section 52-4 causes a correction target pixel to face the flat diffusion plate DBb by controlling a rotating section 53. The rotating section 53 rotates the polarized image acquisition section 20 in the pan direction or in the tilt direction. Further, the correction information generation processing section 52-4 generates the variation correction information regarding the correction target pixel in a similar manner to the first or second embodiment by using the pixel values of pixels around the correction target pixel and the pixel values of the correction target pixel, which faces the flat diffusion plate DBb.

Figure 21:
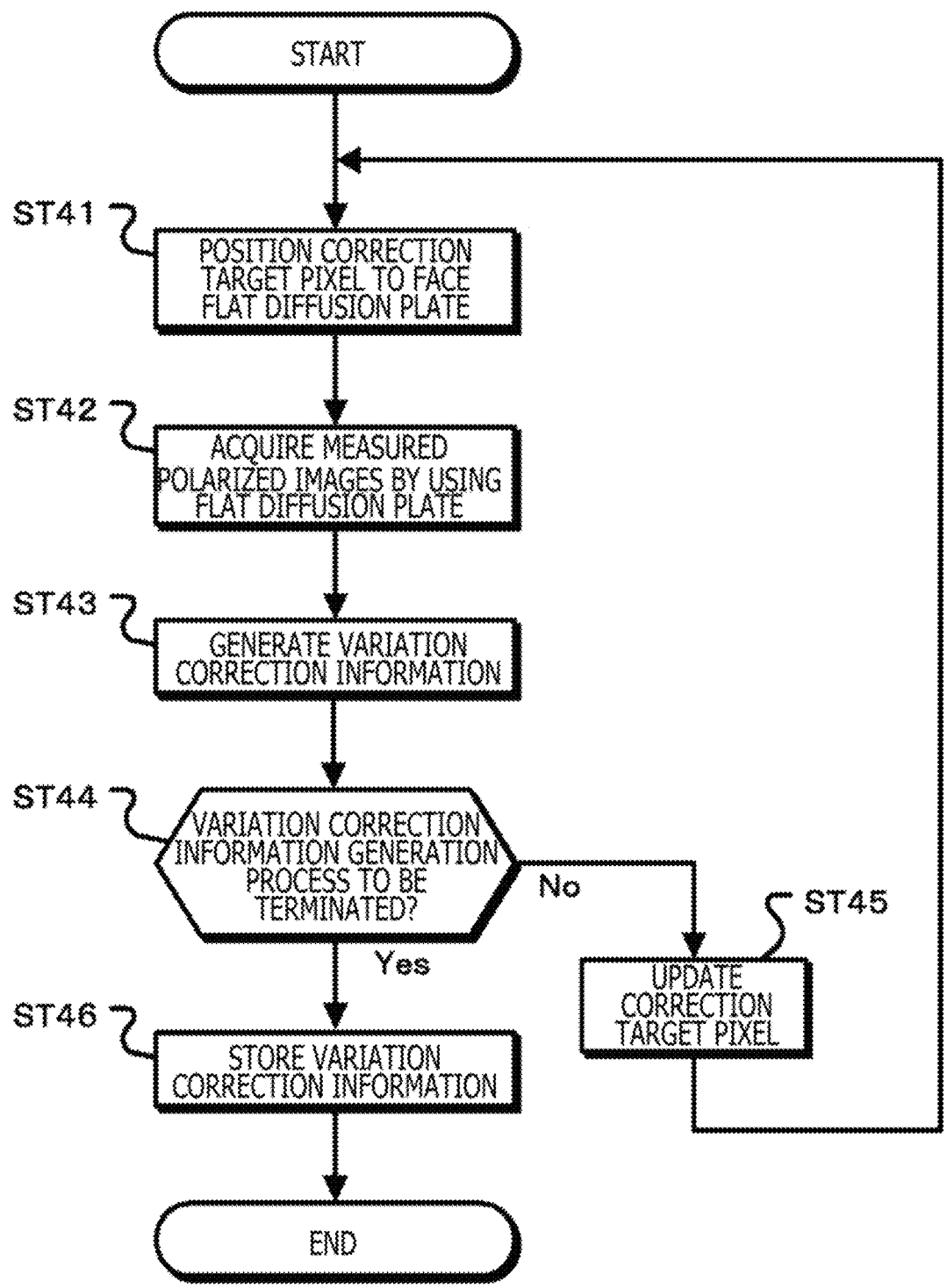
FIG. 21 is a flowchart illustrating an operation according to the fourth embodiment.

FIG. 21 is a flowchart illustrating an operation according to the fourth embodiment. In step ST41, the correction information generation section causes the correction target pixel to face the flat diffusion plate. The correction information generation section 50-4 drives the polarized image acquisition section 20 in the pan direction or in the tilt direction until the correction target pixel of the polarized image acquisition section 20 faces the flat diffusion plate. Upon completion of step ST41, the correction information generation section 50-4 proceeds to step ST42.

In step ST42, the correction information generation section 50-4 acquires a measured polarized image by using the flat diffusion plate. The correction information generation section 50-1 causes the measurement light irradiation section 51-1 to emit illumination light onto the polarized image acquisition section 20 through the flat diffusion plate, causes the correction information generation processing section 52-4 to acquire the measured polarized image generated by the polarized image acquisition section 20, and then proceeds to step ST43.

In step ST43, the correction information generation section generates variation correction information. The correction information generation processing section 52-4 in the correction information generation section 50-4 generates the variation correction information indicative of a correction value for the correction target pixel or for the polarization direction of the correction target pixel, as is the case with the first and second embodiments, and then proceeds to step ST44.

In step ST44, the correction information generation section determines whether or not to terminate a variation correction information generation process. The correction information generation section 50-4 determines whether the generation of variation correction information regarding desired pixels is completed. In a case where the generation of variation correction information is not completed for one or more pixels, the correction information generation section 50-4 proceeds to step ST45. Meanwhile, in a case where the generation of variation correction information is completed for the desired pixels, the correction information generation section 50-4 proceeds to step ST46.

In step ST45, the correction information generation section updates the correction target pixel. The correction information generation section 50-4 regards a pixel whose variation correction information is still not generated, as a new correction target pixel, returns to step ST41, and causes the new correction target pixel to face the flat diffusion plate.

In step ST46, the correction information generation section causes the variation correction information to be stored. The correction information generation processing section 52-4 in the correction information generation section 50-4 causes the correction information storage section 30 to store the generated variation correction information.

Further, in a case where the orientation of the polarized image acquisition section 20 is to be adjusted in the pan direction or in the tilt direction so that the correction target pixel faces the flat diffusion plate, a high-precision orientation adjustment mechanism is necessary for making adjustments until each pixel faces the flat diffusion plate. Therefore, the variation correction information may be generated while a pixel in each region formed by a plurality of pixels is regarded as the correction target pixel, and the generated variation correction information may be used as the variation correction information for each pixel in the region.

The first to third embodiments have been described above with reference to a case where the variation correction information is to be generated for each polarization direction and to a case where the variation correction information is to be generated for each pixel. Further, the fourth embodiment has been described with reference to a case where the variation correction information is to be generated for each pixel. However, the correction information generation section in the fourth embodiment may generate the variation correction information for each polarization direction or each pixel and cause the correction information storage section 30 to store the generated variation correction information. In a case where, for example, the sensitivity variations of pixels having the same polarization direction are obviously smaller than the threshold value in the polarized image acquisition section 20, the variation correction information for each polarization direction is generated. Meanwhile, in a case where the sensitivity variations of pixels having the same polarization direction are obviously not smaller than the threshold value, the variation correction information for each pixel is generated. It should be noted that, in a case where the variation correction information is generated for each polarization direction, the amount of data indicative of the variation correction information is smaller than in a case where the variation correction information is generated for each pixel. Therefore, the storage capacity of the correction information storage section 30 can be decreased. Furthermore, the correction processing section 40 need not read the variation correction information for each pixel from the correction information storage section 30. Therefore, the correction process can be performed efficiently. Moreover, even if significant variations are encountered in a case where the variation correction information is to be generated for each pixel, the correction process can be performed more precisely than in a case where the variation correction information is to be generated for each polarization direction.

<5. Alternative Configurations and Operations>

Incidentally, for the generation of variation correction information, a predetermined imaging optical system used for mounting the polarized image acquisition section 20, for example, in various devices, is attached to the polarized image acquisition section 20. In this case, measurement light according to the characteristics of the predetermined imaging optical system is incident on the image sensor 200 through the polarizer and the color filter. Therefore, the correction information generation section 50 is able to generate the variation correction information for each pixel in order to generate variation correction information for correcting shading caused by the predetermined imaging optical system as well as sensitivity variations caused, for example, by polarizer variations.

Further, when the variation correction information is generated for each pixel without using the imaging optical system, the correction information generation section is able to generate the variation correction information for correcting only sensitivity variations caused, for example, by polarizer variations. Furthermore, in a case where pixel values of a polarized image acquired with the imaging optical system attached are corrected by using the variation correction information for each pixel, which corrects only sensitivity variations, pixel value variations in the corrected polarized image represent variations caused by the characteristics of the imaging optical system. Therefore, using the variation correction information for each pixel, which corrects only sensitivity variations, makes it possible to measure the characteristics of the imaging optical system that relate to polarized image acquisition.

<6. Exemplary Applications>

The technology according to the present disclosure is applicable to various products. The technology according to the present disclosure may be implemented, for example, as a device that is to be mounted in one of various types of movable objects such as automobiles, electric automobiles, hybrid electric automobiles, motorcycles, bicycles, personal mobility devices, airplanes, drones, ships, robots, construction machines, and agricultural machines (tractors).

Figure 22:
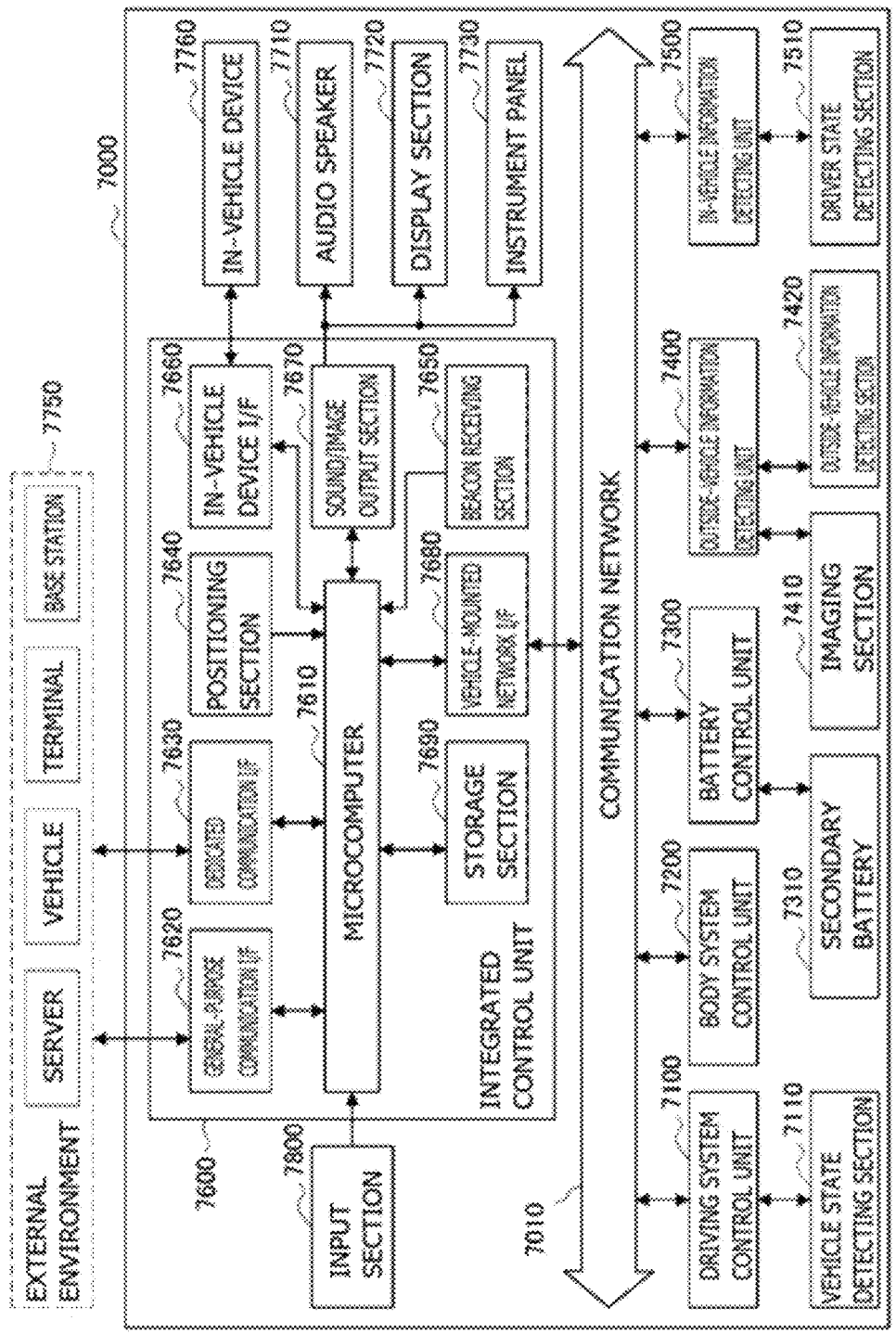
FIG. 22 is a block diagram depicting an example of schematic configuration of a vehicle control system.

FIG. 22 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 22, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wired communication or wireless communication. A functional configuration of the integrated control unit 7600 illustrated in FIG. 22 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 23:
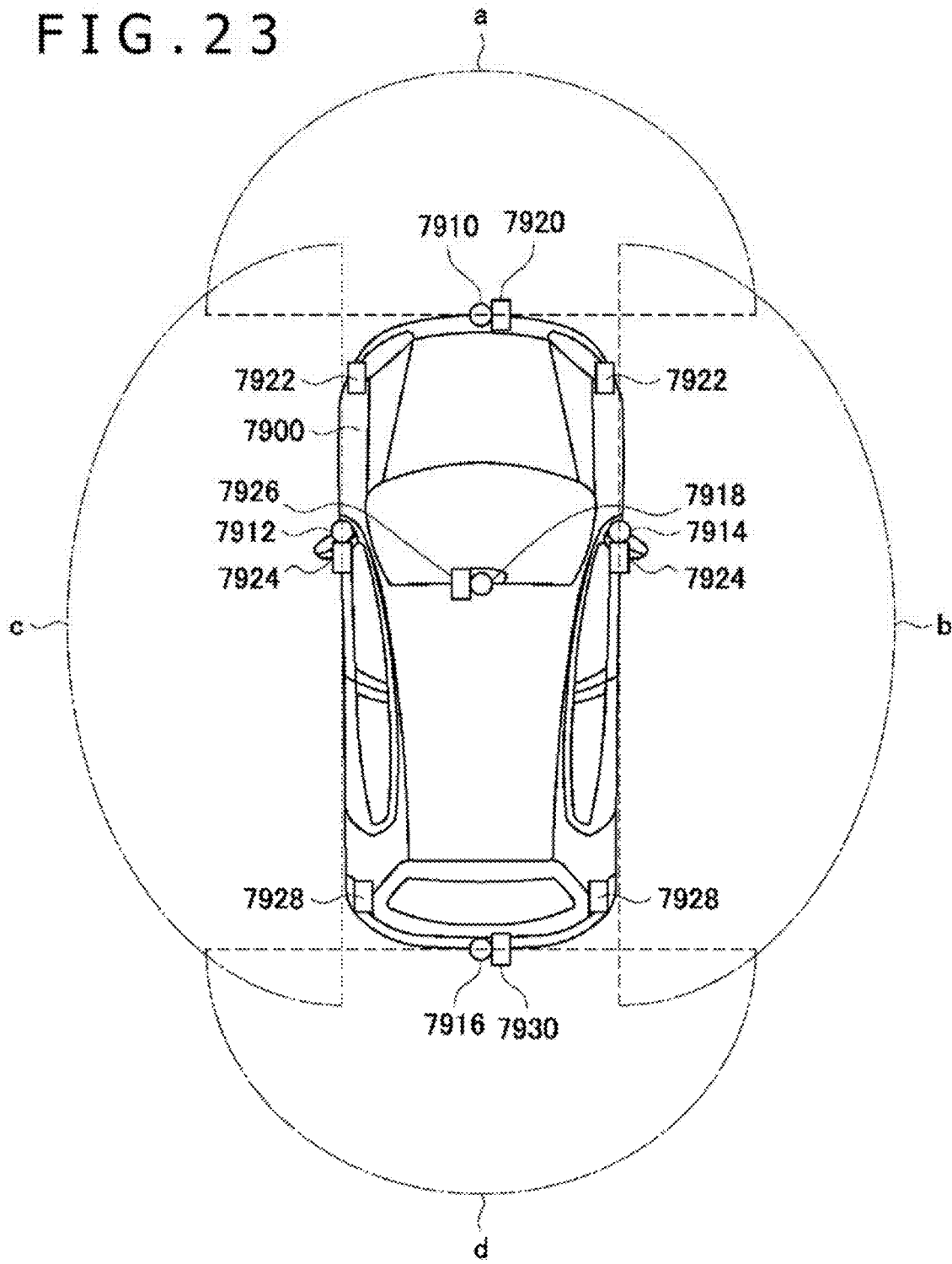
FIG. 23 is a diagram of assistance in explaining an example of installation positions of an outside-vehicle information detecting section and an imaging section.

FIG. 23 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 23 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 22, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 22, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 22 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the above-described vehicle control system 7000, the imaging sections 7410, 7910, 7912, 7914, 7916, 7918 use the polarized image acquisition section. Further, the integrated controller 7600 included in an exemplary application depicted in FIG. 22 includes the correction information storage section 30 and the correction processing section 40. This configuration enables the imaging sections 7410, 7910, 7912, 7914, 7916, 7918 to acquire polarized images having insignificant sensitivity variations. Therefore, the acquired polarized images can be used, for example, for driving assistance and driving control. It should be noted that the correction information storage section 30 and the correction processing section 40 may be implemented by a module (e.g., an integrated circuit module formed by a single die) for the integrated controller 7600 depicted in FIG. 22.

A series of processes described in this description can be performed by hardware, software, or a combination of both. In a case where the processes are to be performed by software, it is possible to install a program, which records a processing sequence, in a memory in a computer incorporated in dedicated hardware and then execute the program, or install the program in a general-purpose computer capable of performing various processes and then execute the program.

For example, the program can be prerecorded on a hard disk, an SSD (solid-state drive), or a ROM (read-only memory), which are used as recording media. Alternatively, the program can be stored (recorded) temporarily or permanently on a flexible disk, a CD-ROM (compact disc read-only memory), an MO (magneto-optical) disk, a DVD (digital versatile disc), a BD (Blu-ray disc (registered trademark)), a magnetic disk, a semiconductor memory card, or other removable recording medium. Such a removable recording medium can be supplied as so-called package software.

As an alternative to the method of installing the program on a computer from a removable recording medium, the program may be transferred from a download site to the computer in a wireless or wired manner via a network such as a LAN (local area network) or the Internet. In such an instance, the computer can receive the transferred program and install it on a built-in hard disk or other recording medium.

The advantages described in this description are merely illustrative and not restrictive. The present technology is not limited to the above-described advantages and can provide additional advantages. Further, the interpretation of the present technology is not limited to those described in conjunction with the foregoing embodiments. The embodiments of the present technology disclose the present technology in an illustrative manner. It is obvious that the embodiments may be modified or changed by those skilled in the art without departing from the spirit and scope of the present technology. More specifically, the spirit of the present technology should be determined in consideration of the appended claims.

Further, the image processing device according to the present technology may also adopt the following configurations.

(1) An image processing device including a correction processing section using pre-generated correction information to correct sensitivity variations caused in a polarized image due to a difference in polarization direction.

(2) The image processing device as described in (1) above, in which the polarized image includes a pixel for each of a plurality of polarization directions and is acquired by a polarized image acquisition section having a polarization imaging element with a polarizer disposed.

(3) The image processing device as described in (1) or (2) above, in which the correction information is generated for each polarization direction.

(4) The image processing device as described in any of (1) to (3) above, in which the correction information is generated for each pixel position in the polarized image.

(5) The image processing device as described in any of (1) to (4) above, in which the correction information includes information for correcting shading in the polarized image.

(6) The image processing device as described in any of (1) to (5) above, in which the polarized image includes a color image, and the correction information is generated for each color component of the polarized image.

(7) The image processing device as described in (6) above, in which the correction information includes information for correcting a white balance of the polarized image.

(8) The image processing device as described in (2) above, in which the correction information includes a correction gain for correcting sensitivity variations caused in the polarized image due to the difference in polarization direction on the basis of a polarized image acquired by the polarized image acquisition section when a measurement light irradiation section emits measurement light having uniform intensity onto the polarized image acquisition section.

(9) The image processing device as described in any of (1) to (8) above, further including a correction information storage section storing the correction information.

Meanwhile, the information generation device according to the present technology may also adopt the following configurations.

(1) An information generation device including a measurement light irradiation section and a correction information generation section. The measurement light irradiation section emits measurement light having uniform intensity onto a polarized image acquisition section acquiring a polarized image. The correction information generation section, on the basis of the polarized image acquired by the polarized image acquisition section when the measurement light is emitted from the measurement light irradiation section, generates correction information for correcting sensitivity variations caused in the polarized image due to a difference in polarization direction.

(2) The information generation device as described in (1) above, in which the measurement light irradiation section emits unpolarized light as the measurement light.

(3) The information generation device as described in (1) above, in which the measurement light irradiation section emits the measurement light onto the polarized image acquisition section through a spherical diffusion plate.

(4) The information generation device as described in (1) above, in which the measurement light irradiation section emits the measurement light onto the polarized image acquisition section through a flat diffusion plate, and the correction information generation section changes an orientation of the polarized image acquisition section with respect to the flat diffusion plate and then generates the correction information.

(5) The information generation device as described in (1) above, in which the measurement light irradiation section emits the measurement light onto the polarized image acquisition section through a flat diffusion plate, and the correction information generation section generates correction information for each pixel on the basis of a focal length and an optical axis center of the polarized image acquisition section.

INDUSTRIAL APPLICABILITY

On the basis of a polarized image acquired when measurement light having uniform intensity is emitted onto the polarized image acquisition section acquiring polarized images, the image processing device, the information generation device, and the information generation method according to the present technology pre-generate correction information for correcting sensitivity variations caused in the acquired polarized image due to a difference in polarization direction, and uses the pre-generated correction information to perform a correction process on the polarized image in order to correct the sensitivity variations due to the difference in polarization direction. Therefore, the image processing device, the information generation device, and the information generation method according to the present technology are able to acquire high-quality polarized images and are suitable for apparatuses performing recognition of a three-dimensional shape, for example, by using polarized images.

REFERENCE SIGNS LIST

10 . . . Polarized image system
20 . . . Polarized image acquisition section
30 . . . Correction information storage section
40 . . . Correction processing section
50, 50-1, 50-2, 50-3, 50-4 . . . Correction information generation section
51-1, 51-2, 51-3, 51-4 . . . Measurement light irradiation section
52-1, 52-2, 52-3, 52-4 . . . Correction information generation processing section
53 . . . Rotating section
200 . . . Image sensor
201 . . . Polarizer
202 . . . Color filter

The invention claimed is:

1. An image processing device comprising:
a correction processing section using pre-generated correction information to correct sensitivity variations caused in a polarized image due to a difference in polarization direction,
wherein the polarized image includes a pixel for each of a plurality of polarization directions and is acquired by a polarized image acquisition section having a polarization imaging element with a polarizer disposed,
wherein the correction information comprises a correction gain for correcting sensitivity variations caused in the polarized image due to the difference in polarization direction,
wherein the correction processing section corrects the sensitivity variations based on a polarized image acquired by the polarized image acquisition section when a measurement light irradiation section emits measurement light having uniform intensity onto the polarized image acquisition section, and
wherein the correction processing section and the polarized image acquisition section are each implemented via at least one processor.

2. The image processing device according to claim 1, wherein the correction information is generated for each polarization direction.

3. The image processing device according to claim 1, wherein the correction information is generated for each pixel position in the polarized image.

4. The image processing device according to claim 1, wherein the correction information includes information for correcting shading caused in the polarized image.

5. The image processing device according to claim 1, wherein the polarized image includes a color image, and the correction information is generated for each color component of the polarized image.

6. The image processing device according to claim 5, wherein the correction information includes information for correcting a white balance of the polarized image.

7. The image processing device according to claim 1, further comprising:
a correction information storage section storing the correction information.

8. An image processing method comprising:
acquiring, by a polarized image acquisition section having a polarization imaging element with a polarizer disposed, a polarized image that includes a pixel for each of a plurality of polarization directions; and
correcting, using pre-generated correction information, sensitivity variations caused in the polarized image due to a difference in polarization direction,
wherein the correction information comprises a correction gain for correcting sensitivity variations caused in the polarized image due to the difference in polarization direction, and
wherein the sensitivity variations are corrected based on a polarized image acquired by the polarized image acquisition section when a measurement light irradiation section emits measurement light having uniform intensity onto the polarized image acquisition section.

9. A non-transitory computer-readable medium having embodied thereon a program, which when executed by a computer causes the computer to execute a method, the method comprising:
    acquiring, by a polarized image acquisition section having a polarization imaging element with a polarizer disposed, a polarized image that includes a pixel for each of a plurality of polarization directions; and
    correcting, using pre-generated correction information, sensitivity variations caused in the polarized image due to a difference in polarization direction,
    wherein the correction information comprises a correction gain for correcting sensitivity variations caused in the polarized image due to the difference in polarization direction, and
    wherein the sensitivity variations are corrected based on a polarized image acquired by the polarized image acquisition section when a measurement light irradiation section emits measurement light having uniform intensity onto the polarized image acquisition section.

* * * * *